US010150931B2

(12) United States Patent
Bredsguard et al.

(10) Patent No.: US 10,150,931 B2
(45) Date of Patent: *Dec. 11, 2018

(54) GREASE COMPOSITIONS COMPRISING ESTOLIDE BASE OILS

(71) Applicant: BIOSYNTHETIC TECHNOLOGIES, LLC, Irvine, CA (US)

(72) Inventors: Jakob Bredsguard, Lake Forest, CA (US); Jeremy Forest, Honolulu, HI (US)

(73) Assignee: Biosynthetic Technologies, LLC, Indianapolis, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/449,768

(22) Filed: Mar. 3, 2017

(65) Prior Publication Data

US 2017/0233676 A1 Aug. 17, 2017

Related U.S. Application Data

(63) Continuation of application No. 15/174,666, filed on Jun. 6, 2016, now Pat. No. 9,605,231, which is a (Continued)

(51) Int. Cl.
*C10M 169/02* (2006.01)
*C10M 105/36* (2006.01)
(Continued)

(52) U.S. Cl.
CPC ........ *C10M 169/02* (2013.01); *C10M 105/36* (2013.01); *C10M 117/04* (2013.01); *C10M 129/10* (2013.01); *C10M 133/46* (2013.01); *C10M 135/06* (2013.01); *C10M 137/10* (2013.01); *C10M 169/06* (2013.01); *C08K 5/10* (2013.01); *C10M 2203/1025* (2013.01); *C10M 2207/023* (2013.01); *C10M 2207/026* (2013.01); *C10M 2207/1256* (2013.01); *C10M 2207/1265* (2013.01); *C10M 2207/1285* (2013.01); *C10M 2207/2825* (2013.01); *C10M 2207/301* (2013.01); *C10M 2207/402* (2013.01); *C10M 2215/064* (2013.01); *C10M 2215/224* (2013.01); *C10M 2219/024* (2013.01); *C10M 2219/068* (2013.01); *C10M 2223/043* (2013.01); *C10M 2223/045* (2013.01); *C10N 2210/02* (2013.01); *C10N 2220/022* (2013.01); (Continued)

(58) Field of Classification Search
CPC .............. C10M 169/02; C10M 137/10; C10M 129/10; C10M 105/36; C10M 117/04; C10M 135/06; C10M 169/06; C10M 2207/2825; C10M 2223/045; C10M 2207/1265; C10M 2207/023; C10M 2219/024; C10M 105/42; C10M 129/78; C10N 2250/10; C10N 2230/10; C10N 2230/06; C08K 5/10
USPC ................. 508/465, 459, 463; 524/311, 306; 549/90
See application file for complete search history.

(56) References Cited

U.S. PATENT DOCUMENTS 2,049,072 A * 7/1936 Mikeska .................. C10M 1/08
252/79
2,862,884 A  12/1958 Dilworth et al.
(Continued)

FOREIGN PATENT DOCUMENTS

JP  07-7228881   8/1995
JP  08-027473    1/1996
(Continued)

OTHER PUBLICATIONS

International Search Report and Written Opinion dated Apr. 11, 2012 in International Application No. PCT/US2012/023933.
(Continued)

*Primary Examiner* — Douglas J McGinty
(74) *Attorney, Agent, or Firm* — Jeremy Forest

(57) ABSTRACT

Provided herein are grease compositions comprising at least one estolide compound of formula:

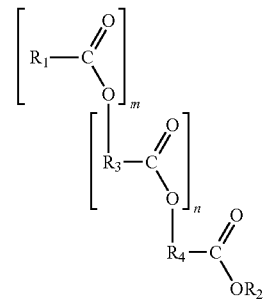

in which n is an integer equal to or greater than 0; m is an integer equal to or greater than 2; $R_1$, independently for each occurrence, is selected from optionally substituted alkyl that is saturated or unsaturated, and branched or unbranched; $R_2$ is selected from hydrogen and optionally substituted alkyl that is saturated or unsaturated, and branched or unbranched; and $R_3$ and $R_4$, independently for each occurrence, are selected from optionally substituted alkyl that is saturated or unsaturated, and branched or unbranched. Also provided are methods of making estolide-based grease products.

26 Claims, No Drawings

Related U.S. Application Data continuation of application No. 13/366,667, filed on Feb. 6, 2012, now Pat. No. 9,394,501.

(60) Provisional application No. 61/498,499, filed on Jun. 17, 2011, provisional application No. 61/541,030, filed on Sep. 29, 2011.

(51) Int. Cl.
*C10M 117/04* (2006.01)
*C10M 129/10* (2006.01)
*C10M 135/06* (2006.01)
*C10M 137/10* (2006.01)
*C10M 169/06* (2006.01)
*C10M 133/46* (2006.01)
*C08K 5/10* (2006.01)

(52) U.S. Cl.
CPC .... *C10N 2220/025* (2013.01); *C10N 2230/02* (2013.01); *C10N 2230/06* (2013.01); *C10N 2230/10* (2013.01); *C10N 2230/12* (2013.01); *C10N 2230/14* (2013.01); *C10N 2230/20* (2013.01); *C10N 2230/64* (2013.01); *C10N 2250/10* (2013.01)

(56) References Cited

U.S. PATENT DOCUMENTS

| | | | |
|---|---|---|---|
| 2,969,325 A | 1/1961 | Roach et al. | |
| 5,380,894 A | 1/1995 | Burg et al. | |
| 5,427,704 A * | 6/1995 | Lawate | C10M 159/08 508/491 |
| 5,451,332 A * | 9/1995 | Lawate | C07C 69/675 508/280 |
| 5,595,965 A | 1/1997 | Wiggins | |
| 5,612,298 A | 3/1997 | Bae et al. | |
| 5,858,934 A | 1/1999 | Wiggins et al. | |
| 6,018,063 A * | 1/2000 | Isbell | C10M 101/04 508/460 |
| 6,316,649 B1 * | 11/2001 | Cermak | C10M 101/04 508/485 |
| 6,432,889 B1 | 8/2002 | Kinoshita et al. | |
| 7,141,535 B2 | 11/2006 | Belot et al. | |
| 7,256,163 B2 | 8/2007 | Akada et al. | |
| 8,236,194 B1 | 8/2012 | Bredsguard et al. | |
| 8,258,326 B1 | 9/2012 | Forest et al. | |
| 8,268,199 B1 | 9/2012 | Forest et al. | |
| 8,287,754 B1 | 10/2012 | Thompson et al. | |
| 8,580,985 B2 | 11/2013 | Thompson et al. | |
| 8,742,150 B2 * | 6/2014 | Potula | C07C 67/08 508/463 |
| 8,859,658 B2 * | 10/2014 | Bredsguard | C10M 105/42 524/306 |
| 9,133,410 B2 * | 9/2015 | Bredsguard | C10M 169/04 |
| 9,199,911 B2 | 12/2015 | Thompson et al. | |
| 9,365,796 B2 * | 6/2016 | Bredsguard | C10M 105/40 |
| 9,376,643 B2 * | 6/2016 | Bredsguard | C10M 169/045 |
| 9,394,501 B2 * | 7/2016 | Forest | C10M 169/02 |
| 9,403,752 B2 | 8/2016 | Thompson et al. | |
| 9,464,255 B2 * | 10/2016 | Brekan | C07C 69/34 |
| 9,481,850 B2 * | 11/2016 | Brekan | C10M 159/12 |
| 9,546,336 B2 * | 1/2017 | Thompson | C09K 5/044 |
| 9,605,231 B2 * | 3/2017 | Bredsguard | C10M 169/02 |
| 9,637,700 B2 * | 5/2017 | Thompson | C10M 111/04 |
| 9,738,618 B2 * | 8/2017 | DiBiase | C08F 20/14 |
| 9,771,466 B2 * | 9/2017 | Patil | C08K 5/12 |
| 9,896,424 B2 * | 2/2018 | Di Biase | C08F 20/14 |
| 2002/0142920 A1 * | 10/2002 | Sugimori | C10M 117/04 508/116 |
| 2005/0014658 A1 | 1/2005 | Akao | |
| 2005/0197260 A1 | 9/2005 | Johnson et al. | |
| 2006/0264338 A1 | 11/2006 | Kawamura | |
| 2007/0207934 A1 | 9/2007 | Ozaki et al. | |
| 2009/0062165 A1 | 3/2009 | Denis et al. | |
| 2009/0088353 A1 | 4/2009 | Berry et al. | |
| 2009/0274629 A1 * | 11/2009 | Brown | A61K 8/0204 424/9.6 |
| 2010/0111884 A1 * | 5/2010 | Acker | A61K 8/046 424/60 |
| 2010/0120643 A1 | 5/2010 | Brown et al. | |
| 2012/0083435 A1 | 4/2012 | Bredsguard | |
| 2012/0172609 A1 | 7/2012 | Bredsguard et al. | |
| 2012/0178660 A1 | 7/2012 | Bredsguard | |
| 2014/0100150 A1 * | 4/2014 | Vinci | C10M 105/42 508/497 |
| 2016/0032211 A1 * | 2/2016 | Thompson | C09K 5/044 508/499 |
| 2016/0281023 A1 | 9/2016 | Bredsguard et al. | |
| 2017/0240832 A1 * | 8/2017 | Hahn | C10M 105/04 |

FOREIGN PATENT DOCUMENTS

| | | | | |
|---|---|---|---|---|
| WO | 1999025794 | | 5/1999 | |
| WO | 2001053247 | | 7/2001 | |
| WO | 2003011455 | | 2/2003 | |
| WO | WO-2016096074 A2 * | 6/2016 | | C10M 169/00 |

OTHER PUBLICATIONS

International Search Report and Written Opinion dated Apr. 24, 2013, in International Application No. PCT/US12/068293.
Machine Translation of JP08-027473, filed Jul. 15, 1994.
Notice of Allowance dated Sep. 20, 2013, for U.S. Appl. No. 13/707,480.
Office Action dated Aug. 6, 2015, for U.S. Appl. No. 13/026,387, filed Sep. 13, 2013.
Office Action dated Feb. 28, 2013, for U.S. Appl. No. 13/707,480.
Office Action dated Jun. 5, 2013, for U.S. Appl. No. 13/707,480.
Office Action dated Mar. 20, 2015, for U.S. Appl. No. 13/026,387, filed Sep. 13, 2013.
Office Action dated Sep. 11, 2013, for U.S. Appl. No. 13/707,480.
U.S. Appl. No. 15/226,766, filed Aug. 2, 2016.
Notice of Allowance dated Oct. 16, 2015, for U.S. Appl. No. 13/026,387, filed Sep. 13, 2013.
Office Action dated Oct. 24, 2016, for U.S. Appl. No. 15/174,666.
Notice of Allowance dated Feb. 14, 2017, for U.S. Appl. No. 15/174,666.
Cermak et al., "Physical properties of saturated estolides and their 2-ethylhexyl esters", 16:, 2002, 119-27.
Abstract of JP07-228881, filed Feb 17, 1994.

* cited by examiner

GREASE COMPOSITIONS COMPRISING ESTOLIDE BASE OILS

CROSS REFERENCE TO RELATED APPLICATIONS

This application claims the benefit under 35 U.S.C. § 119(e) of U.S. Provisional Patent Application No. 61/498,499, filed Jun. 17, 2011, and U.S. Provisional Patent Application No. 61/541,030, filed Sep. 29, 2011, both of which are incorporated herein by reference in their entireties for all purposes.

FIELD

The present disclosure relates to grease compositions comprising estolide base oils and methods of making the same.

BACKGROUND

Synthetic esters such as polyol esters and adipates, low viscosity poly alpha olefins (PAO) such as PAO 2, and vegetable oils such as canola oil and oleates have been described for use industrially as biodegradable base stocks to formulate lubricants. Such base stocks may be used in the production of lubricating oils for automotives, industrial lubricants, and lubricating greases. Finished lubricants typically comprise the base oil and additives to help achieve the desired viscometric properties, low temperature behavior, oxidative stability, corrosion protection, demulsibility and water rejection, friction coefficients, lubricities, wear protection, air release, color and other properties. Grease compositions serve an important role as lubricants in various industrial and automotive applications. However, it is generally understood that the biodegradability of lubricants and greases cannot be improved by using common additives that are available in today's marketplace. For environmental, economical, and regulatory reasons, it is of interest to produce biodegradable lubricating oils, other biodegradable lubricants, and compositions including lubricating oils and/or lubricants, from renewable sources of biological origin.

SUMMARY

Described herein are estolide compounds, estolide-containing compositions, grease compositions comprising estolides, and methods of making the same.

In certain embodiments, the estolide-containing grease compositions comprise at least one estolide selected from compounds of Formula I:

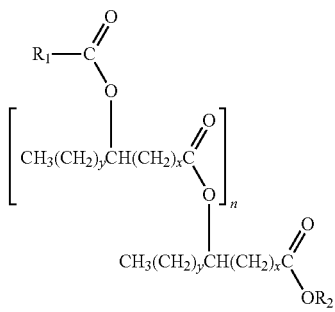

Formula I wherein
x is, independently for each occurrence, an integer selected from 0, 1, 2, 3, 4, 5, 6, 7, 8, 9, 10, 11, 12, 13, 14, 15, 16, 17, 18, 19, and 20;
y is, independently for each occurrence, an integer selected from 0, 1, 2, 3, 4, 5, 6, 7, 8, 9, 10, 11, 12, 13, 14, 15, 16, 17, 18, 19, and 20;
n is an integer selected from 0 to 12;
$R_1$ is an optionally substituted alkyl that is saturated or unsaturated, and branched or unbranched; and
$R_2$ is selected from hydrogen and optionally substituted alkyl that is saturated or unsaturated, and branched or unbranched;
wherein each fatty acid chain residue of said at least one compound is independently optionally substituted.

In certain embodiments, the estolide-containing grease compositions comprise at least one compound of Formula II:

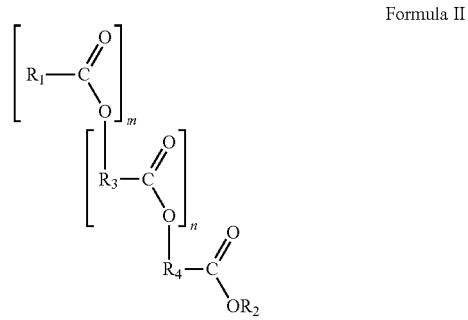

Formula II wherein
m is an integer equal to or greater than 1;
n is an integer equal to or greater than 0;
$R_1$, independently for each occurrence, is an optionally substituted alkyl that is saturated or unsaturated, and branched or unbranched; and
$R_2$ is selected from hydrogen and optionally substituted alkyl that is saturated or unsaturated, and branched or unbranched; and
$R_3$ and $R_4$, independently for each occurrence, are selected from optionally substituted alkyl that is saturated or unsaturated, and branched or unbranched.

In certain embodiments, the estolide-containing grease compositions comprise at least one compound represented of Formula III:

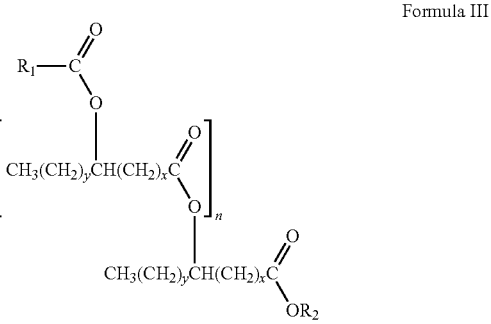

Formula III wherein
x is, independently for each occurrence, an integer selected from 0, 1, 2, 3, 4, 5, 6, 7, 8, 9, 10, 11, 12, 13, 14, 15, 16, 17, 18, 19, and 20;

y is, independently for each occurrence, an integer selected from 0, 1, 2, 3, 4, 5, 6, 7, 8, 9, 10, 11, 12, 13, 14, 15, 16, 17, 18, 19, and 20;

n is an integer equal to or greater than 0;

$R_1$ is an optionally substituted alkyl that is saturated or unsaturated, and branched or unbranched; and $R_2$ is selected from hydrogen and optionally substituted alkyl that is saturated or unsaturated, and branched or unbranched;

wherein each fatty acid chain residue of said at least one compound is independently optionally substituted.

DETAILED DESCRIPTION

"Grease" or "grease compositions," as used herein, refer to thick or viscous compounds, mixtures of compounds, or compositions having a viscosity of greater than $1 \times 10^4$ cps (10 Pa·s) at 1/s shear rate and 20° C.

The use of greases may result in the dispersion of such lubricants into waterways, such as rivers, oceans and lakes. Petroleum base oils used in common grease formulations, as well as their additives, are typically non-biodegradable and can be toxic. The present disclosure provides for the preparation and use of greases comprising partially or fully biodegradable base oils, including base oils comprising one or more estolides.

In certain embodiments, the grease compositions comprising one or more estolides are partially or fully biodegradable and thereby pose diminished risk to the environment. In certain embodiments, the grease compositions meet guidelines set for by the Organization for Economic Cooperation and Development (OECD) for degradation and accumulation testing. The OECD has indicated that several tests may be used to determine the "ready biodegradability" of organic chemicals. Aerobic ready biodegradability by OECD 301D measures the mineralization of the test sample to $CO_2$ in closed aerobic microcosms that simulate an aerobic aquatic environment, with microorganisms seeded from a waste-water treatment plant. OECD 301D is considered representative of most aerobic environments that are likely to receive waste materials. Aerobic "ultimate biodegradability" can be determined by OECD 302D. Under OECD 302D, microorganisms are pre-acclimated to biodegradation of the test material during a pre-incubation period, then incubated in sealed vessels with relatively high concentrations of microorganisms and enriched mineral salts medium. OECD 302D ultimately determines whether the test materials are completely biodegradable, albeit under less stringent conditions than "ready biodegradability" assays.

In certain embodiments, the grease compositions comprising one or more estolides may meet specified standards or possess characteristics including one or more selected from (1) anti-wear characteristics; (2) extreme-pressure (EP) properties; (3) anti-fretting capabilities; (4) heat resistance; (5) seal-swelling properties; and (6) insolubility in hydrocarbons and petroleum products.

As used in the present specification, the following words, phrases and symbols are generally intended to have the meanings as set forth below, except to the extent that the context in which they are used indicates otherwise. The following abbreviations and terms have the indicated meanings throughout:

A dash ("-") that is not between two letters or symbols is used to indicate a point of attachment for a substituent. For example, —C(O)NH$_2$ is attached through the carbon atom.

"Alkoxy" by itself or as part of another substituent refers to a radical —OR$^{31}$ where R$^{31}$ is alkyl, cycloalkyl, cycloalkylalkyl, aryl, or arylalkyl, which can be substituted, as defined herein. In some embodiments, alkoxy groups have from 1 to 8 carbon atoms. In some embodiments, alkoxy groups have 1, 2, 3, 4, 5, 6, 7, or 8 carbon atoms. Examples of alkoxy groups include, but are not limited to, methoxy, ethoxy, propoxy, butoxy, cyclohexyloxy, and the like.

"Alkyl" by itself or as part of another substituent refers to a saturated or unsaturated, branched, or straight-chain monovalent hydrocarbon radical derived by the removal of one hydrogen atom from a single carbon atom of a parent alkane, alkene, or alkyne. Examples of alkyl groups include, but are not limited to, methyl; ethyls such as ethanyl, ethenyl, and ethynyl; propyls such as propan-1-yl, propan-2-yl, prop-1-en-1-yl, prop-1-en-2-yl, prop-2-en-1-yl (allyl), prop-1-yn-1-yl, prop-2-yn-1-yl, etc.; butyls such as butan-1-yl, butan-2-yl, 2-methyl-propan-1-yl, 2-methyl-propan-2-yl, but-1-en-1-yl, but-1-en-2-yl, 2-methyl-prop-1-en-1-yl, but-2-en-1-yl, but-2-en-2-yl, buta-1,3-dien-1-yl, buta-1,3-dien-2-yl, but-1-yn-1-yl, but-1-yn-3-yl, but-3-yn-1-yl, etc.; and the like.

Unless otherwise indicated, the term "alkyl" is specifically intended to include groups having any degree or level of saturation, i.e., groups having exclusively single carbon-carbon bonds, groups having one or more double carbon-carbon bonds, groups having one or more triple carbon-carbon bonds, and groups having mixtures of single, double, and triple carbon-carbon bonds. Where a specific level of saturation is intended, the terms "alkanyl," "alkenyl," and "alkynyl" are used. In certain embodiments, an alkyl group comprises from 1 to 40 carbon atoms, in certain embodiments, from 1 to 22 or 1 to 18 carbon atoms, in certain embodiments, from 1 to 16 or 1 to 8 carbon atoms, and in certain embodiments from 1 to 6 or 1 to 3 carbon atoms. In certain embodiments, an alkyl group comprises from 8 to 22 carbon atoms, in certain embodiments, from 8 to 18 or 8 to 16. In some embodiments, the alkyl group comprises from 3 to 20 or 7 to 17 carbons. In some embodiments, the alkyl group comprises 1, 2, 3, 4, 5, 6, 7, 8, 9, 10, 11, 12, 13, 14, 15, 16, 17, 18, 19, 20, 21, or 22 carbon atoms.

"Aryl" by itself or as part of another substituent refers to a monovalent aromatic hydrocarbon radical derived by the removal of one hydrogen atom from a single carbon atom of a parent aromatic ring system. Aryl encompasses 5- and 6-membered carbocyclic aromatic rings, for example, benzene; bicyclic ring systems wherein at least one ring is carbocyclic and aromatic, for example, naphthalene, indane, and tetralin; and tricyclic ring systems wherein at least one ring is carbocyclic and aromatic, for example, fluorene. Aryl encompasses multiple ring systems having at least one carbocyclic aromatic ring fused to at least one carbocyclic aromatic ring, cycloalkyl ring, or heterocycloalkyl ring. For example, aryl includes 5- and 6-membered carbocyclic aromatic rings fused to a 5- to 7-membered non-aromatic heterocycloalkyl ring containing one or more heteroatoms chosen from N, O, and S. For such fused, bicyclic ring systems wherein only one of the rings is a carbocyclic aromatic ring, the point of attachment may be at the carbocyclic aromatic ring or the heterocycloalkyl ring. Examples of aryl groups include, but are not limited to, groups derived from aceanthrylene, acenaphthylene, acephenanthrylene, anthracene, azulene, benzene, chrysene, coronene, fluoranthene, fluorene, hexacene, hexaphene, hexalene, as-indacene, s-indacene, indane, indene, naphthalene, octacene, octaphene, octalene, ovalene, penta-2,4-diene, pentacene, pentalene, pentaphene, perylene, phenalene, phenanthrene, picene, pleiadene, pyrene, pyranthrene, rubicene, triphenylene, trinaphthalene, and the like. In certain embodiments, an aryl group can comprise from 5 to 20 carbon atoms, and in certain embodiments, from 5 to 12 carbon atoms. In certain embodiments, an aryl group can comprise 5, 6, 7, 8, 9, 10, 11, 12, 13, 14, 15, 16, 17, 18, 19, or 20 carbon atoms. Aryl, however, does not encompass or overlap in any way with heteroaryl, separately defined herein. Hence, a multiple ring system in which one or more carbocyclic aromatic rings is fused to a heterocycloalkyl aromatic ring, is heteroaryl, not aryl, as defined herein.

"Arylalkyl" by itself or as part of another substituent refers to an acyclic alkyl radical in which one of the hydrogen atoms bonded to a carbon atom, typically a terminal or sp$^3$ carbon atom, is replaced with an aryl group. Examples of arylalkyl groups include, but are not limited to, benzyl, 2-phenylethan-1-yl, 2-phenylethen-1-yl, naphthylmethyl, 2-naphthylethan-1-yl, 2-naphthylethen-1-yl, naphthobenzyl, 2-naphthophenylethan-1-yl, and the like. Where specific alkyl moieties are intended, the nomenclature arylalkanyl, arylalkenyl, or arylalkynyl is used. In certain embodiments, an arylalkyl group is $C_{7-30}$ arylalkyl, e.g., the alkanyl, alkenyl, or alkynyl moiety of the arylalkyl group is $C_{1-10}$ and the aryl moiety is $C_{6-20}$, and in certain embodiments, an arylalkyl group is $C_{7-20}$ arylalkyl, e.g., the alkanyl, alkenyl, or alkynyl moiety of the arylalkyl group is $C_{1-8}$ and the aryl moiety is $C_{6-12}$.

Estolide "base oil" and "base stock", unless otherwise indicated, refer to any composition comprising one or more estolide compounds. It should be understood that an estolide "base oil" or "base stock" is not limited to compositions for a particular use, and may generally refer to compositions comprising one or more estolides, including mixtures of estolides. Estolide base oils and base stocks can also include compounds other than estolides.

"Compounds" refers to compounds encompassed by structural Formula I, II, and III herein and includes any specific compounds within the formula whose structure is disclosed herein. Compounds may be identified either by their chemical structure and/or chemical name. When the chemical structure and chemical name conflict, the chemical structure is determinative of the identity of the compound. The compounds described herein may contain one or more chiral centers and/or double bonds and therefore may exist as stereoisomers such as double-bond isomers (i.e., geometric isomers), enantiomers, or diastereomers. Accordingly, any chemical structures within the scope of the specification depicted, in whole or in part, with a relative configuration encompass all possible enantiomers and stereoisomers of the illustrated compounds including the stereoisomerically pure form (e.g., geometrically pure, enantiomerically pure, or diastereomerically pure) and enantiomeric and stereoisomeric mixtures. Enantiomeric and stereoisomeric mixtures may be resolved into their component enantiomers or stereoisomers using separation techniques or chiral synthesis techniques well known to the skilled artisan.

For the purposes of the present disclosure, "chiral compounds" are compounds having at least one center of chirality (i.e. at least one asymmetric atom, in particular at least one asymmetric C atom), having an axis of chirality, a plane of chirality or a screw structure. "Achiral compounds" are compounds which are not chiral.

Compounds of Formula I, II, and III include, but are not limited to, optical isomers of compounds of Formula I, II, and III, racemates thereof, and other mixtures thereof. In such embodiments, the single enantiomers or diastereomers, i.e., optically active forms, can be obtained by asymmetric synthesis or by resolution of the racemates. Resolution of the racemates may be accomplished by, for example, chromatography, using, for example a chiral high-pressure liquid chromatography (HPLC) column. However, unless otherwise stated, it should be assumed that Formula I, II, and III cover all asymmetric variants of the compounds described herein, including isomers, racemates, enantiomers, diastereomers, and other mixtures thereof. In addition, compounds of Formula I, II and III include Z- and E-forms (e.g., cis- and trans-forms) of compounds with double bonds. The compounds of Formula I, II, and III may also exist in several tautomeric forms including the enol form, the keto form, and mixtures thereof. Accordingly, the chemical structures depicted herein encompass all possible tautomeric forms of the illustrated compounds.

"Cycloalkyl" by itself or as part of another substituent refers to a saturated or unsaturated cyclic alkyl radical. Where a specific level of saturation is intended, the nomenclature "cycloalkanyl" or "cycloalkenyl" is used. Examples of cycloalkyl groups include, but are not limited to, groups derived from cyclopropane, cyclobutane, cyclopentane, cyclohexane, and the like. In certain embodiments, a cycloalkyl group is $C_{3-15}$ cycloalkyl, and in certain embodiments, $C_{3-12}$ cycloalkyl or $C_{5-12}$ cycloalkyl. In certain embodiments, a cycloalkyl group is a $C_5$, $C_6$, $C_7$, $C_8$, $C_9$, $C_{10}$, $C_{11}$, $C_{12}$, $C_{13}$, $C_{14}$, or $C_{15}$ cycloalkyl.

"Cycloalkylalkyl" by itself or as part of another substituent refers to an acyclic alkyl radical in which one of the hydrogen atoms bonded to a carbon atom, typically a terminal or sp$^3$ carbon atom, is replaced with a cycloalkyl group. Where specific alkyl moieties are intended, the nomenclature cycloalkylalkanyl, cycloalkylalkenyl, or cycloalkylalkynyl is used. In certain embodiments, a cycloalkylalkyl group is $C_{7-30}$ cycloalkylalkyl, e.g., the alkanyl, alkenyl, or alkynyl moiety of the cycloalkylalkyl group is $C_{1-10}$ and the cycloalkyl moiety is $C_{6-20}$, and in certain embodiments, a cycloalkylalkyl group is $C_{7-20}$ cycloalkylalkyl, e.g., the alkanyl, alkenyl, or alkynyl moiety of the cycloalkylalkyl group is $C_{1-8}$ and the cycloalkyl moiety is $C_{4-20}$ or $C_{6-12}$.

"Halogen" refers to a fluoro, chloro, bromo, or iodo group.

"Heteroaryl" by itself or as part of another substituent refers to a monovalent heteroaromatic radical derived by the removal of one hydrogen atom from a single atom of a parent heteroaromatic ring system. Heteroaryl encompasses multiple ring systems having at least one aromatic ring fused to at least one other ring, which can be aromatic or non-aromatic in which at least one ring atom is a heteroatom. Heteroaryl encompasses 5- to 12-membered aromatic, such as 5- to 7-membered, monocyclic rings containing one or more, for example, from 1 to 4, or in certain embodiments, from 1 to 3, heteroatoms chosen from N, O, and S, with the remaining ring atoms being carbon; and bicyclic heterocycloalkyl rings containing one or more, for example, from 1 to 4, or in certain embodiments, from 1 to 3, heteroatoms chosen from N, O, and S, with the remaining ring atoms being carbon and wherein at least one heteroatom is present in an aromatic ring. For example, heteroaryl includes a 5- to 7-membered heterocycloalkyl, aromatic ring fused to a 5- to 7-membered cycloalkyl ring. For such fused, bicyclic heteroaryl ring systems wherein only one of the rings contains one or more heteroatoms, the point of attachment may be at the heteroaromatic ring or the cycloalkyl ring. In certain embodiments, when the total number of N, S, and O atoms in the heteroaryl group exceeds one, the heteroatoms are not adjacent to one another. In certain embodiments, the total number of N, S, and O atoms in the heteroaryl group is not more than two. In certain embodiments, the total number of N, S, and O atoms in the aromatic heterocycle is not more than one. Heteroaryl does not encompass or overlap with aryl as defined herein.

Examples of heteroaryl groups include, but are not limited to, groups derived from acridine, arsindole, carbazole, β-carboline, chromane, chromene, cinnoline, furan, imidazole, indazole, indole, indoline, indolizine, isobenzofuran, isochromene, isoindole, isoindoline, isoquinoline, isothiazole, isoxazole, naphthyridine, oxadiazole, oxazole, perimidine, phenanthridine, phenanthroline, phenazine, phthalazine, pteridine, purine, pyran, pyrazine, pyrazole, pyridazine, pyridine, pyrimidine, pyrrole, pyrrolizine, quinazoline, quinoline, quinolizine, quinoxaline, tetrazole, thiadiazole, thiazole, thiophene, triazole, xanthene, and the like. In certain embodiments, a heteroaryl group is from 5- to 20-membered heteroaryl, and in certain embodiments from 5- to 12-membered heteroaryl or from 5- to 10-membered heteroaryl. In certain embodiments, a heteroaryl group is a 5-, 6-, 7-, 8-, 9-, 10-, 11-, 12-, 13-, 14-, 15-, 16-, 17-, 18-, 19-, or 20-membered heteroaryl. In certain embodiments heteroaryl groups are those derived from thiophene, pyrrole, benzothiophene, benzofuran, indole, pyridine, quinoline, imidazole, oxazole, and pyrazine.

"Heteroarylalkyl" by itself or as part of another substituent refers to an acyclic alkyl radical in which one of the hydrogen atoms bonded to a carbon atom, typically a terminal or $sp^3$ carbon atom, is replaced with a heteroaryl group. Where specific alkyl moieties are intended, the nomenclature heteroarylalkanyl, heteroarylalkenyl, or heteroarylalkynyl is used. In certain embodiments, a heteroarylalkyl group is a 6- to 30-membered heteroarylalkyl, e.g., the alkanyl, alkenyl, or alkynyl moiety of the heteroarylalkyl is 1- to 10-membered and the heteroaryl moiety is a 5- to 20-membered heteroaryl, and in certain embodiments, 6- to 20-membered heteroarylalkyl, e.g., the alkanyl, alkenyl, or alkynyl moiety of the heteroarylalkyl is 1- to 8-membered and the heteroaryl moiety is a 5- to 12-membered heteroaryl.

"Heterocycloalkyl" by itself or as part of another substituent refers to a partially saturated or unsaturated cyclic alkyl radical in which one or more carbon atoms (and any associated hydrogen atoms) are independently replaced with the same or different heteroatom. Examples of heteroatoms to replace the carbon atom(s) include, but are not limited to, N, P, O, S, Si, etc. Where a specific level of saturation is intended, the nomenclature "heterocycloalkanyl" or "heterocycloalkenyl" is used. Examples of heterocycloalkyl groups include, but are not limited to, groups derived from epoxides, azirines, thiiranes, imidazolidine, morpholine, piperazine, piperidine, pyrazolidine, pyrrolidine, quinuclidine, and the like.

"Heterocycloalkylalkyl" by itself or as part of another substituent refers to an acyclic alkyl radical in which one of the hydrogen atoms bonded to a carbon atom, typically a terminal or $sp^3$ carbon atom, is replaced with a heterocycloalkyl group. Where specific alkyl moieties are intended, the nomenclature heterocycloalkylalkanyl, heterocycloalkylalkenyl, or heterocycloalkylalkynyl is used. In certain embodiments, a heterocycloalkylalkyl group is a 6- to 30-membered heterocycloalkylalkyl, e.g., the alkanyl, alkenyl, or alkynyl moiety of the heterocycloalkylalkyl is 1- to 10-membered and the heterocycloalkyl moiety is a 5- to 20-membered heterocycloalkyl, and in certain embodiments, 6- to 20-membered heterocycloalkylalkyl, e.g., the alkanyl, alkenyl, or alkynyl moiety of the heterocycloalkylalkyl is 1- to 8-membered and the heterocycloalkyl moiety is a 5- to 12-membered heterocycloalkyl.

"Mixture" refers to a collection of molecules or chemical substances. Each component in a mixture can be independently varied. A mixture may contain, or consist essentially of, two or more substances intermingled with or without a constant percentage composition, wherein each component may or may not retain its essential original properties, and where molecular phase mixing may or may not occur. In mixtures, the components making up the mixture may or may not remain distinguishable from each other by virtue of their chemical structure.

"Parent aromatic ring system" refers to an unsaturated cyclic or polycyclic ring system having a conjugated π (pi) electron system. Included within the definition of "parent aromatic ring system" are fused ring systems in which one or more of the rings are aromatic and one or more of the rings are saturated or unsaturated, such as, for example, fluorene, indane, indene, phenalene, etc. Examples of parent aromatic ring systems include, but are not limited to, aceanthrylene, acenaphthylene, acephenanthrylene, anthracene, azulene, benzene, chrysene, coronene, fluoranthene, fluorene, hexacene, hexaphene, hexalene, as-indacene, s-indacene, indane, indene, naphthalene, octacene, octaphene, octalene, ovalene, penta-2,4-diene, pentacene, pentalene, pentaphene, perylene, phenalene, phenanthrene, picene, pleiadene, pyrene, pyranthrene, rubicene, triphenylene, trinaphthalene, and the like.

"Parent heteroaromatic ring system" refers to a parent aromatic ring system in which one or more carbon atoms (and any associated hydrogen atoms) are independently replaced with the same or different heteroatom. Examples of heteroatoms to replace the carbon atoms include, but are not limited to, N, P, O, S, Si, etc. Specifically included within the definition of "parent heteroaromatic ring systems" are fused ring systems in which one or more of the rings are aromatic and one or more of the rings are saturated or unsaturated, such as, for example, arsindole, benzodioxan, benzofuran, chromane, chromene, indole, indoline, xanthene, etc. Examples of parent heteroaromatic ring systems include, but are not limited to, arsindole, carbazole, β-carboline, chromane, chromene, cinnoline, furan, imidazole, indazole, indole, indoline, indolizine, isobenzofuran, isochromene, isoindole, isoindoline, isoquinoline, isothiazole, isoxazole, naphthyridine, oxadiazole, oxazole, perimidine, phenanthridine, phenanthroline, phenazine, phthalazine, pteridine, purine, pyran, pyrazine, pyrazole, pyridazine, pyridine, pyrimidine, pyrrole, pyrrolizine, quinazoline, quinoline, quinolizine, quinoxaline, tetrazole, thiadiazole, thiazole, thiophene, triazole, xanthene, and the like.

"Substituted" refers to a group in which one or more hydrogen atoms are independently replaced with the same or different substituent(s). Examples of substituents include, but are not limited to, —$R^{64}$, —$R^{60}$, —$O^-$, —OH, =O, —$OR^{60}$, —$SR^{60}$, —$S^-$, =S, —$NR^{60}R^{61}$, =$NR^{60}$, —CN, —$CF_3$, —OCN, —SCN, —NO, —$NO_2$, =$N_2$, —$N_3$, —$S(O)_2O$—, —$S(O)_2OH$, —$S(O)_2R^{60}$, —$OS(O_2)O^-$, —$OS(O)_2R^{60}$, —$P(O)(O^-)_2$, —$P(O)(OR^{60})(O^-)$, —$OP(O)(OR^{60})(OR^{61})$, —$C(O)R^{60}$, —$C(S)R^{60}$, —$C(O)OR^{60}$, —$C(O)NR^{60}R^{61}$, —$C(O)O^-$, —$C(S)OR^{60}$, —$NR^{62}C(O)NR^{60}R^{61}$, —$NR^{62}C(S)NR^{60}R^{61}$, —$NR^{62}C(NR^{63})NR^{60}R^{61}$, —$C(NR^{62})NR^{60}R^{61}$, —$S(O)_2NR^{60}R^{61}$, —$NR^{63}S(O)_2R^{60}$, —$NR^{63}C(O)R^{60}$, and —$S(O)R^{60}$;

wherein each —$R^{64}$ is independently a halogen; each $R^{60}$ and $R^{61}$ are independently alkyl, substituted alkyl, alkoxy, substituted alkoxy, cycloalkyl, substituted cycloalkyl, heterocycloalkyl, substituted heterocycloalkyl, aryl, substituted aryl, heteroaryl, substituted heteroaryl, arylalkyl, substituted arylalkyl, heteroarylalkyl, or substituted heteroarylalkyl, or $R^{60}$ and $R^{61}$ together with the nitrogen atom to which they are bonded form a heterocycloalkyl, substituted heterocycloalkyl, heteroaryl, or substituted heteroaryl ring, and $R^{62}$ and $R^{63}$ are independently alkyl, substituted alkyl, aryl, substituted aryl, arylalkyl, substituted arylalkyl, cycloalkyl, substituted cycloalkyl, heterocycloalkyl, substituted heterocycloalkyl, heteroaryl, substituted heteroaryl, heteroarylalkyl, or substituted heteroarylalkyl, or $R^{62}$ and $R^{63}$ together with the atom to which they are bonded form one or more heterocycloalkyl, substituted heterocycloalkyl, heteroaryl, or substituted heteroaryl rings;

wherein the "substituted" substituents, as defined above for $R^{60}$, $R^{61}$, $R^{62}$, and $R^{63}$, are substituted with one or more, such as one, two, or three, groups independently selected from alkyl, -alkyl-OH, —O-haloalkyl, -alkyl-NH$_2$, alkoxy, cycloalkyl, cycloalkylalkyl, heterocycloalkyl, heterocycloalkylalkyl, aryl, heteroaryl, arylalkyl, heteroarylalkyl, —O$^-$, —OH, =O, —O-alkyl, —O-aryl, —O-heteroarylalkyl, —O-cycloalkyl, —O-heterocycloalkyl, —SH, —S$^-$, =S, —S-alkyl, —S-aryl, —S— heteroarylalkyl, —S-cycloalkyl, —S-heterocycloalkyl, —NH$_2$, =NH, —CN, —CF$_3$, —OCN, —SCN, —NO, —NO$_2$, =N$_2$, —N$_3$, —S(O)$_2$O$^-$, —S(O)$_2$, —S(O)$_2$OH, —OS(O$_2$)O$^-$, —SO$_2$ (alkyl), —SO$_2$(phenyl), —SO$_2$(haloalkyl), —SO$_2$NH$_2$, —SO$_2$NH(alkyl), —SO$_2$NH(phenyl), —P(O)(O$^-$)$_2$, —P(O)(O-alkyl)(O$^-$), —OP(O)(O-alkyl)(O-alkyl), —CO$_2$H, —C(O)O(alkyl), —CON(alkyl)(alkyl), —CONH(alkyl), —CONH$_2$, —C(O)(alkyl), —C(O)(phenyl), —C(O)(haloalkyl), —OC(O)(alkyl), —N(alkyl)(alkyl), —NH(alkyl), —N(alkyl)(alkylphenyl), —NH(alkylphenyl), —NHC(O)(alkyl), —NHC(O)(phenyl), —N(alkyl)C(O)(alkyl), and —N(alkyl)C(O)(phenyl).

As used in this specification and the appended claims, the articles "a," "an," and "the" include plural referents unless expressly and unequivocally limited to one referent.

All numerical ranges herein include all numerical values and ranges of all numerical values within the recited range of numerical values.

The present disclosure relates to estolide compounds, compositions and methods of making the same. In certain embodiments, the present disclosure also relates to estolide compounds, compositions comprising estolide compounds, for high- and low-viscosity base oil stocks and lubricants, the synthesis of such compounds, and the formulation of such compositions. In certain embodiments, the present disclosure relates to biosynthetic estolides having desired viscometric properties, while retaining or even improving other properties such as oxidative stability and pour point. In certain embodiments, new methods of preparing estolide compounds exhibiting such properties are provided. The present disclosure also relates to compositions comprising certain estolide compounds exhibiting such properties, such as estolide-based grease compositions.

In certain embodiments the grease compositions described herein comprise at least one estolide compound of Formula I:

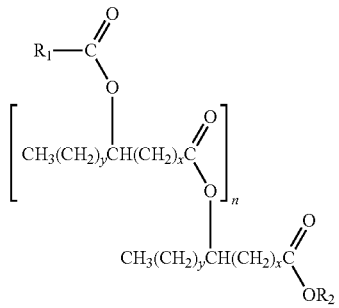

Formula I wherein x is, independently for each occurrence, an integer selected from 0, 1, 2, 3, 4, 5, 6, 7, 8, 9, 10, 11, 12, 13, 14, 15, 16, 17, 18, 19, and 20;

y is, independently for each occurrence, an integer selected from 0, 1, 2, 3, 4, 5, 6, 7, 8, 9, 10, 11, 12, 13, 14, 15, 16, 17, 18, 19, and 20;

n is an integer selected from 0 to 12;

$R_1$ is an optionally substituted alkyl that is saturated or unsaturated, and branched or unbranched; and $R_2$ is selected from hydrogen and optionally substituted alkyl that is saturated or unsaturated, and branched or unbranched;

wherein each fatty acid chain residue of said at least one compound is independently optionally substituted.

In certain embodiments the grease composition comprises at least one estolide compound of Formula II:

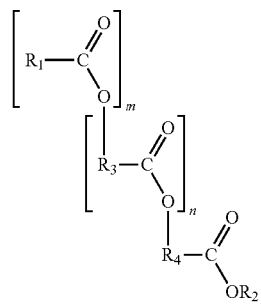

Formula II wherein m is an integer greater than or equal to 1;

n is an integer greater than or equal to 0;

$R_1$, for each occurrence, is an optionally substituted alkyl that is saturated or unsaturated, and branched or unbranched;

$R_2$ is selected from hydrogen and optionally substituted alkyl that is saturated or unsaturated, and branched or unbranched; and $R_3$ and $R_4$, independently for each occurrence, are selected from optionally substituted alkyl that is saturated or unsaturated, and branched or unbranched.

In certain embodiments the grease composition comprises at least one estolide compound selected from compounds of Formula III:

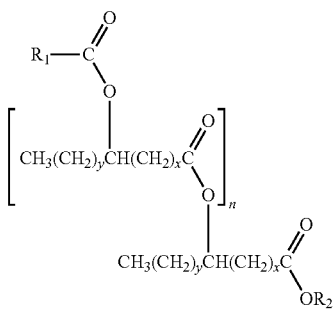

Formula III wherein x is, independently for each occurrence, an integer selected from 0 to 20;

y is, independently for each occurrence, an integer selected from 0 to 20;

n is an integer greater than or equal to 0;

$R_1$ is an optionally substituted alkyl that is saturated or unsaturated, and branched or unbranched; and $R_2$ is an optionally substituted alkyl that is saturated or unsaturated, and branched or unbranched, wherein each fatty acid chain residue of said at least one compound is independently optionally substituted.

In certain embodiments, the composition comprises at least one estolide of Formula I, II, or III where $R_1$ is hydrogen.

The terms "chain" or "fatty acid chain" or "fatty acid chain residue," as used with respect to the estolide compounds of Formula I, II, and III, refer to one or more of the fatty acid residues incorporated in estolide compounds, e.g., $R_3$ or $R_4$ of Formula II, or the structures represented by $CH_3(CH_2)_yCH(CH_2)_xC(O)O$— in Formula I and III.

The $R_1$ in Formula I, II, and III at the top of each Formula shown is an example of what may be referred to as a "cap" or "capping material," as it "caps" the top of the estolide. Similarly, the capping group may be an organic acid residue of general formula —OC(O)-alkyl, i.e., a carboxylic acid with a substituted or unsubstituted, saturated or unsaturated, and/or branched or unbranched alkyl as defined herein, or a formic acid residue. In certain embodiments, the "cap" or "capping group" is a fatty acid. In certain embodiments, the capping group, regardless of size, is substituted or unsubstituted, saturated or unsaturated, and/or branched or unbranched. The cap or capping material may also be referred to as the primary or alpha (α) chain.

Depending on the manner in which the estolide is synthesized, the cap or capping group alkyl may be the only alkyl from an organic acid residue in the resulting estolide that is unsaturated. In certain embodiments, it may be desirable to use a saturated organic or fatty-acid cap to increase the overall saturation of the estolide and/or to increase the resulting estolide's stability. For example, in certain embodiments, it may be desirable to provide a method of providing a saturated capped estolide by hydrogenating an unsaturated cap using any suitable methods available to those of ordinary skill in the art. Hydrogenation may be used with various sources of the fatty-acid feedstock, which may include mono- and/or polyunsaturated fatty acids. Without being bound to any particular theory, in certain embodiments, hydrogenating the estolide may help to improve the overall stability of the molecule. However, a fully-hydrogenated estolide, such as an estolide with a larger fatty acid cap, may exhibit increased pour point temperatures. In certain embodiments, it may be desirable to offset any loss in desirable pour-point characteristics by using shorter, saturated capping materials.

The $R_4C(O)O$— of Formula II or structure $CH_3(CH_2)_yCH(CH_2)_xC(O)O$— of Formula I and III serve as the "base" or "base chain residue" of the estolide. Depending on the manner in which the estolide is synthesized, the base organic acid or fatty acid residue may be the only residue that remains in its free-acid form after the initial synthesis of the estolide. However, in certain embodiments, in an effort to alter or improve the properties of the estolide, the free acid may be reacted with any number of substituents. For example, it may be desirable to react the free acid estolide with alcohols, glycols, amines, or other suitable reactants to provide the corresponding ester, amide, or other reaction products. The base or base chain residue may also be referred to as tertiary or gamma (γ) chains.

The $R_3C(O)O$— of Formula II or structure $CH_3(CH_2)_yCH(CH_2)_xC(O)O$— of Formula I and III are linking residues that link the capping material and the base fatty-acid residue together. There may be any number of linking residues in the estolide, including when n=0 and the estolide is in its dimer form. Depending on the manner in which the estolide is prepared, a linking residue may be a fatty acid and may initially be in an unsaturated form during synthesis. In some embodiments, the estolide will be formed when a catalyst is used to produce a carbocation at the fatty acid's site of unsaturation, which is followed by nucleophilic attack on the carbocation by the carboxylic group of another fatty acid. In some embodiments, it may be desirable to have a linking fatty acid that is monounsaturated so that when the fatty acids link together, all of the sites of unsaturation are eliminated. The linking residue(s) may also be referred to as secondary or beta (β) chains.

In certain embodiments, the cap is an acetyl group, the linking residue(s) is one or more fatty acid residues, and the base chain residue is a fatty acid residue. In certain embodiments, the linking residues present in an estolide differ from one another. In certain embodiments, one or more of the linking residues differs from the base chain residue.

As noted above, in certain embodiments, suitable unsaturated fatty acids for preparing the estolides may include any mono- or polyunsaturated fatty acid. For example, monounsaturated fatty acids, along with a suitable catalyst, will form a single carbocation that allows for the addition of a second fatty acid, whereby a single link between two fatty acids is formed. Suitable monounsaturated fatty acids may include, but are not limited to, palmitoleic acid (16:1), vaccenic acid (18:1), oleic acid (18:1), eicosenoic acid (20:1), erucic acid (22:1), and nervonic acid (24:1). In addition, in certain embodiments, polyunsaturated fatty acids may be used to create estolides. Suitable polyunsaturated fatty acids may include, but are not limited to, hexadecatrienoic acid (16:3), alpha-linolenic acid (18:3), stearidonic acid (18:4), eicosatrienoic acid (20:3), eicosatetraenoic acid (20:4), eicosapentaenoic acid (20:5), heneicosapentaenoic acid (21:5), docosapentaenoic acid (22:5), docosahexaenoic acid (22:6), tetracosapentaenoic acid (24:5), tetracosahexaenoic acid (24:6), linoleic acid (18:2), gamma-linoleic acid (18:3), eicosadienoic acid (20:2), dihomo-gamma-linolenic acid (20:3), arachidonic acid (20:4), docosadienoic acid (20:2), adrenic acid (22:4), docosapentaenoic acid (22:5), tetracosatetraenoic acid (22:4), tetracosapentaenoic acid (24:5), pinolenic acid (18:3), podocarpic acid (20:3), rumenic acid (18:2), alpha-calendic acid (18:3), beta-calendic acid (18:3), jacaric acid (18:3), alpha-eleostearic acid (18:3), beta-eleostearic (18:3), catalpic acid (18:3), punicic acid (18:3), rumelenic acid (18:3), alpha-parinaric acid (18:4), beta-parinaric acid (18:4), and bosseopentaenoic acid (20:5).

The process for preparing the estolide compounds described herein may include the use of any natural or synthetic fatty acid source. However, it may be desirable to source the fatty acids from a renewable biological feedstock. For example, suitable starting materials of biological origin include, but are not limited to, plant fats, plant oils, plant waxes, animal fats, animal oils, animal waxes, fish fats, fish oils, fish waxes, algal oils and mixtures of two or more thereof. Other potential fatty acid sources include, but are not limited to, waste and recycled food-grade fats and oils, fats, oils, and waxes obtained by genetic engineering, fossil fuel-based materials and other sources of the materials desired.

In some embodiments, the estolide comprises fatty-acid chains of varying lengths. In some embodiments, x is, independently for each occurrence, an integer selected from 0 to 20, 0 to 18, 0 to 16, 0 to 14, 1 to 12, 1 to 10, 2 to 8, 6 to 8, or 4 to 6. In some embodiments, x is, independently for each occurrence, an integer selected from 7 and 8. In some embodiments, x is, independently for each occurrence, an integer selected from 0, 1, 2, 3, 4, 5, 6, 7, 8, 9, 10, 11, 12, 13, 14, 15, 16, 17, 18, 19, and 20.

In some embodiments, y is, independently for each occurrence, an integer selected from 0 to 20, 0 to 18, 0 to 16, 0 to 14, 1 to 12, 1 to 10, 2 to 8, 6 to 8, or 4 to 6. In some embodiments, y is, independently for each occurrence, an integer selected from 7 and 8. In some embodiments, y is, independently for each occurrence, an integer selected from 0, 1, 2, 3, 4, 5, 6, 7, 8, 9, 10, 11, 12, 13, 14, 15, 16, 17, 18, 19, and 20.

In some embodiments, x+y is, independently for each chain, an integer selected from 0 to 40, 0 to 20, 10 to 20, or 12 to 18. In some embodiments, x+y is, independently for each chain, an integer selected from 13 to 15. In some embodiments, x+y is 15. In some embodiments, x+y is, independently for each chain, an integer selected from 6, 7, 8, 9, 10, 11, 12, 13, 14, 15, 16, 17, 18, 19, 20, 21, 22, 23, and 24.

In some embodiments, the estolide compound of Formula I, II, or III may comprise any number of fatty acid residues to form an "n-mer" estolide. For example, the estolide may be in its dimer (n=0), trimer (n=1), tetramer (n=2), pentamer (n=3), hexamer (n=4), heptamer (n=5), octamer (n=6), nonamer (n=7), or decamer (n=8) form. In some embodiments, n is an integer selected from 0 to 20, 0 to 18, 0 to 16, 0 to 14, 0 to 12, 0 to 10, 0 to 8, or 0 to 6. In some embodiments, n is an integer selected from 0 to 4. In some embodiments, n is 1, wherein said at least one compound of Formula I, II, or III comprises the trimer. In some embodiments, n is greater than 1. In some embodiments, n is an integer selected from 0, 1, 2, 3, 4, 5, 6, 7, 8, 9, 10, 11, 12, 13, 14, 15, 16, 17, 18, 19, and 20.

In some embodiments, $R_1$ of Formula I, II, or III is an optionally substituted alkyl that is saturated or unsaturated, and branched or unbranched. In some embodiments, the alkyl group is a $C_1$ to $C_{40}$ alkyl, $C_1$ to $C_{22}$ alkyl or $C_1$ to $C_{18}$ alkyl. In some embodiments, the alkyl group is selected from $C_7$ to $C_{17}$ alkyl. In some embodiments, $R_1$ is selected from $C_7$ alkyl, $C_9$ alkyl, $C_{11}$ alkyl, $C_{13}$ alkyl, $C_{15}$ alkyl, and $C_{17}$ alkyl. In some embodiments, $R_1$ is selected from $C_{13}$ to $C_{17}$ alkyl, such as from $C_{13}$ alkyl, $C_{15}$ alkyl, and $C_{17}$ alkyl. In some embodiments, $R_1$ is a $C_1$, $C_2$, $C_3$, $C_4$, $C_5$, $C_6$, $C_7$, $C_8$, $C_9$, $C_{10}$, $C_{11}$, $C_{12}$, $C_{13}$, $C_{14}$, $C_{15}$, $C_{16}$, $C_{17}$, $C_{18}$, $C_{19}$, $C_{20}$, $C_{21}$, or $C_{22}$ alkyl.

In some embodiments, $R_2$ of Formula I, II, or III is an optionally substituted alkyl that is saturated or unsaturated, and branched or unbranched. In some embodiments, the alkyl group is a $C_1$ to $C_{40}$ alkyl, $C_1$ to $C_{22}$ alkyl or $C_1$ to $C_{18}$ alkyl. In some embodiments, the alkyl group is selected from $C_7$ to $C_{17}$ alkyl. In some embodiments, $R_2$ is selected from $C_7$ alkyl, $C_9$ alkyl, $C_{11}$ alkyl, $C_{13}$ alkyl, $C_{15}$ alkyl, and $C_{17}$ alkyl. In some embodiments, $R_2$ is selected from $C_{13}$ to $C_{17}$ alkyl, such as from $C_{13}$ alkyl, $C_{15}$ alkyl, and $C_{17}$ alkyl. In some embodiments, $R_2$ is a $C_1$, $C_2$, $C_3$, $C_4$, $C_5$, $C_6$, $C_7$, $C_8$, $C_9$, $C_{10}$, $C_{11}$, $C_{12}$, $C_{13}$, $C_{14}$, $C_{15}$, $C_{16}$, $C_{17}$, $C_{18}$, $C_{19}$, $C_{20}$, $C_{21}$, or $C_{22}$ alkyl.

In some embodiments, $R_3$ is an optionally substituted alkyl that is saturated or unsaturated, and branched or unbranched. In some embodiments, the alkyl group is a $C_1$ to $C_{40}$ alkyl, $C_1$ to $C_{22}$ alkyl or $C_1$ to $C_{18}$ alkyl. In some embodiments, the alkyl group is selected from $C_7$ to $C_{17}$ alkyl. In some embodiments, $R_3$ is selected from $C_7$ alkyl, $C_9$ alkyl, $C_{11}$ alkyl, $C_{13}$ alkyl, $C_{15}$ alkyl, and $C_{17}$ alkyl. In some embodiments, $R_3$ is selected from $C_{13}$ to $C_{17}$ alkyl, such as from $C_{13}$ alkyl, $C_{15}$ alkyl, and $C_{17}$ alkyl. In some embodiments, $R_3$ is a $C_1$, $C_2$, $C_3$, $C_4$, $C_5$, $C_6$, $C_7$, $C_8$, $C_9$, $C_{10}$, $C_{11}$, $C_{12}$, $C_{13}$, $C_{14}$, $C_{15}$, $C_{16}$, $C_{17}$, $C_{18}$, $C_{19}$, $C_{20}$, $C_{21}$, or $C_{22}$ alkyl.

In some embodiments, $R_4$ is an optionally substituted alkyl that is saturated or unsaturated, and branched or unbranched. In some embodiments, the alkyl group is a $C_1$ to $C_{40}$ alkyl, $C_1$ to $C_{22}$ alkyl or $C_1$ to $C_{18}$ alkyl. In some embodiments, the alkyl group is selected from $C_7$ to $C_{17}$ alkyl. In some embodiments, $R_4$ is selected from $C_7$ alkyl, $C_9$ alkyl, $C_{11}$ alkyl, $C_{13}$ alkyl, $C_{15}$ alkyl, and $C_{17}$ alkyl. In some embodiments, $R_4$ is selected from $C_{13}$ to $C_{17}$ alkyl, such as from $C_{13}$ alkyl, $C_{15}$ alkyl, and $C_{17}$ alkyl. In some embodiments, $R_4$ is a $C_1$, $C_2$, $C_3$, $C_4$, $C_5$, $C_6$, $C_7$, $C_8$, $C_9$, $C_{10}$, $C_{11}$, $C_{12}$, $C_{13}$, $C_{14}$, $C_{15}$, $C_{16}$, $C_{17}$, $C_{18}$, $C_{19}$, $C_{20}$, $C_{21}$, or $C_{22}$ alkyl.

As noted above, in certain embodiments, it may be possible to manipulate one or more of the estolides' properties by altering the length of $R_1$ and/or its degree of saturation. However, in certain embodiments, the level of substitution on $R_1$ may also be altered to change or even improve the estolides' properties. Without being bound to any particular theory, in certain embodiments, it is believed that the presence of polar substituents on $R_1$, such as one or more hydroxy groups, may increase the viscosity of the estolide, while increasing pour point. Accordingly, in some embodiments, $R_1$ will be unsubstituted or optionally substituted with a group that is not hydroxyl.

In some embodiments, the estolide is in its free-acid form, wherein $R_2$ of Formula I, II, or III is hydrogen. In some embodiments, $R_2$ is selected from optionally substituted alkyl that is saturated or unsaturated, and branched or unbranched. In certain embodiments, the $R_2$ residue may comprise any desired alkyl group, such as those derived from esterification of the estolide with the alcohols identified in the examples herein. In some embodiments, the alkyl group is selected from $C_1$ to $C_{40}$, $C_1$ to $C_{22}$, $C_3$ to $C_{20}$, $C_1$ to $C_{18}$, or $C_6$ to $C_{12}$ alkyl. In some embodiments, $R_2$ may be selected from $C_3$ alkyl, $C_4$ alkyl, $C_8$ alkyl, $C_{12}$ alkyl, $C_{16}$ alkyl, $C_{18}$ alkyl, and $C_{20}$ alkyl. For example, in certain embodiments, $R_2$ may be branched, such as isopropyl, isobutyl, or 2-ethylhexyl. In some embodiments, $R_2$ may be a larger alkyl group, branched or unbranched, comprising $C_{12}$ alkyl, $C_{16}$ alkyl, $C_{18}$ alkyl, or $C_{20}$ alkyl. Such groups at the $R_2$ position may be derived from esterification of the free-acid estolide using the Jarcol™ line of alcohols marketed by Jarchem Industries, Inc. of Newark, N.J., including Jarcol™ I-18CG, I-20, I-12, I-16, I-18T, and 85BJ. In some cases, $R_2$ may be sourced from certain alcohols to provide branched alkyls such as isostearyl and isopalmityl. It should be understood that such isopalmityl and isostearyl akyl groups may cover any branched variation of $C_{16}$ and $C_{18}$, respectively. For example, the estolides described herein may comprise highly-branched isopalmityl or isostearyl groups at the $R_2$ position, derived from the Fineoxocol® line of isopalmityl and isostearyl alcohols marketed by Nissan Chemical America Corporation of Houston, Tex., including Fineoxocol® 180, 180N, and 1600. Without being bound to any particular theory, in embodiments, large, highly-branched alkyl groups (e.g., isopalmityl and isostearyl) at the $R_2$ position of the estolides can provide at least one way to increase the lubricant's viscosity, while substantially retaining or even reducing its pour point.

In some embodiments, the compounds described herein may comprise a mixture of two or more estolide compounds of Formula I, II, and III. It is possible to characterize the chemical makeup of an estolide, a mixture of estolides, or a composition comprising estolides, by using the compound's, mixture's, or composition's measured estolide number (EN) of compound or composition. The EN represents the average number of fatty acids added to the base fatty acid. The EN also represents the average number of estolide linkages per molecule:

$$EN = n+1$$

wherein n is the number of secondary (β) fatty acids. Accordingly, a single estolide compound will have an EN that is a whole number, for example for dimers, trimers, and tetramers:

$$\text{dimer } EN=1$$

$$\text{trimer } EN=2$$

$$\text{tetramer } EN=3$$

However, a composition comprising two or more estolide compounds may have an EN that is a whole number or a fraction of a whole number. For example, a composition having a 1:1 molar ratio of dimer and trimer would have an EN of 1.5, while a composition having a 1:1 molar ratio of tetramer and trimer would have an EN of 2.5.

In some embodiments, the compositions may comprise a mixture of two or more estolides having an EN that is an integer or fraction of an integer that is greater than 4.5, or even 5.0. In some embodiments, the EN may be an integer or fraction of an integer selected from about 1.0 to about 5.0. In some embodiments, the EN is an integer or fraction of an integer selected from 1.2 to about 4.5. In some embodiments, the EN is selected from a value greater than 1.0, 1.2, 1.4, 1.6, 1.8, 2.0, 2.2, 2.4, 2.6, 2.8, 3.0, 3.2, 3.4, 3.6, 3.8, 4.0, 4.2, 4.4, 4.6, 4.8, 5.0, 5.2, 5.4, 5.6 and 5.8. In some embodiments, the EN is selected from a value less than 1.2, 1.4, 1.6, 1.8, 2.0, 2.2, 2.4, 2.6, 2.8, 3.0, 3.2, 3.4, 3.6, 3.8, 4.0, 4.2, 4.4, 4.6, 4.8, and 5.0, 5.2, 5.4, 5.6, 5.8, and 6.0. In some embodiments, the EN is selected from 1, 1.2, 1.4, 1.6, 1.8, 2.0, 2.2, 2.4, 2.6, 2.8, 3.0, 3.2, 3.4, 3.6, 3.8, 4.0, 4.2, 4.4, 4.6, 4.8, 5.0, 5.2, 5.4, 5.6, 5.8, and 6.0.

As noted above, it should be understood that the chains of the estolide compounds may be independently optionally substituted, wherein one or more hydrogens are removed and replaced with one or more of the substituents identified herein. Similarly, two or more of the hydrogen residues may be removed to provide one or more sites of unsaturation, such as a cis or trans double bond. Further, the chains may optionally comprise branched hydrocarbon residues. For example, in some embodiments the estolides described herein may comprise at least one compound of Formula II:

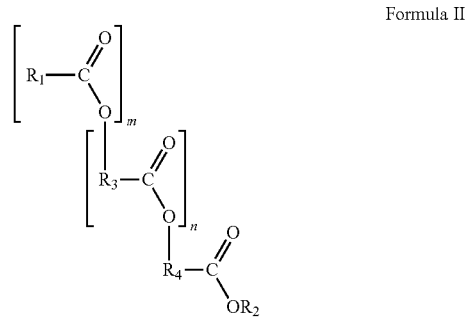

Formula II wherein
m is an integer equal to or greater than 1;
n is an integer equal to or greater than 0;
$R_1$ is an optionally substituted alkyl that is saturated or unsaturated, and branched or unbranched
$R_2$ is selected from hydrogen and optionally substituted alkyl that is saturated or unsaturated, and branched or unbranched; and
$R_3$ and $R_4$, independently for each occurrence, are selected from optionally substituted alkyl that is saturated or unsaturated, and branched or unbranched.

In certain embodiments, m is 1. In some embodiments, m is an integer selected from 2, 3, 4, and 5. In some embodiments, n is an integer selected from 1, 2, 3, 4, 5, 6, 7, 8, 9, 10, 11, and 12. In some embodiments, one or more $R_3$ differs from one or more other $R_3$ in a compound of Formula II. In some embodiments, one or more $R_3$ differs from $R_4$ in a compound of Formula II. In some embodiments, if the compounds of Formula II are prepared from one or more polyunsaturated fatty acids, it is possible that one or more of $R_3$ and $R_4$ will have one or more sites of unsaturation. In some embodiments, if the compounds of Formula II are prepared from one or more branched fatty acids, it is possible that one or more of $R_3$ and $R_4$ will be branched.

In some embodiments, $R_3$ and $R_4$ can be $CH_3(CH_2)_yCH(CH_2)_x-$, where x is, independently for each occurrence, an integer selected from 0, 1, 2, 3, 4, 5, 6, 7, 8, 9, 10, 11, 12, 13, 14, 15, 16, 17, 18, 19, and 20, and y is, independently for each occurrence, an integer selected from 0, 1, 2, 3, 4, 5, 6, 7, 8, 9, 10, 11, 12, 13, 14, 15, 16, 17, 18, 19, and 20. Where both $R_3$ and $R_4$ are $CH_3(CH_2)_yCH(CH_2)_x-$, the compounds may be compounds according to Formula I and III.

Without being bound to any particular theory, in certain embodiments, altering the EN produces estolides having desired viscometric properties while substantially retaining or even reducing pour point. For example, in some embodiments the estolides exhibit a decreased pour point upon increasing the EN value. Accordingly, in certain embodiments, a method is provided for retaining or decreasing the pour point of an estolide base oil by increasing the EN of the base oil, or a method is provided for retaining or decreasing the pour point of a composition comprising an estolide base oil by increasing the EN of the base oil. In some embodiments, the method comprises: selecting an estolide base oil having an initial EN and an initial pour point; and removing at least a portion of the base oil, said portion exhibiting an EN that is less than the initial EN of the base oil, wherein the resulting estolide base oil exhibits an EN that is greater than the initial EN of the base oil, and a pour point that is equal to or lower than the initial pour point of the base oil. In some embodiments, the selected estolide base oil is prepared by oligomerizing at least one first unsaturated fatty acid with at least one second unsaturated fatty acid and/or saturated fatty acid. In some embodiments, the removing at least a portion of the base oil is accomplished by use of at least one of distillation, chromatography, membrane separation, phase separation, affinity separation, and solvent extraction. In some embodiments, the distillation takes place at a temperature and/or pressure that is suitable to separate the estolide base oil into different "cuts" that individually exhibit different EN values. In some embodiments, this may be accomplished by subjecting the base oil temperature of at least about 250° C. and an absolute pressure of no greater than about 25 microns. In some embodiments, the distillation takes place at a temperature range of about 250° C. to about 310° C. and an absolute pressure range of about 10 microns to about 25 microns.

In some embodiments, estolide compounds and compositions exhibit an EN that is greater than or equal to 1, such as an integer or fraction of an integer selected from about 1.0 to about 2.0. In some embodiments, the EN is an integer or fraction of an integer selected from about 1.0 to about 1.6. In some embodiments, the EN is a fraction of an integer selected from about 1.1 to about 1.5. In some embodiments, the EN is selected from a value greater than 1.0, 1.1, 1.2, 1.3, 1.4, 1.5, 1.6, 1.7, 1.8, and 1.9. In some embodiments, the EN is selected from a value less than 1.1, 1.2, 1.3, 1.4, 1.5, 1.6, 1.7, 1.8, 1.9, and 2.0.

In some embodiments, the EN is greater than or equal to 1.5, such as an integer or fraction of an integer selected from about 1.8 to about 2.8. In some embodiments, the EN is an integer or fraction of an integer selected from about 2.0 to about 2.6. In some embodiments, the EN is a fraction of an integer selected from about 2.1 to about 2.5. In some embodiments, the EN is selected from a value greater than 1.8, 1.9, 2.0, 2.1, 2.2, 2.3, 2.4, 2.5, 2.6, and 2.7. In some embodiments, the EN is selected from a value less than 1.9, 2.0, 2.1, 2.2, 2.3, 2.4, 2.5, 2.6, 2.7, and 2.8. In some embodiments, the EN is about 1.8, 2.0, 2.2, 2.4, 2.6, or 2.8.

In some embodiments, the EN is greater than or equal to about 4, such as an integer or fraction of an integer selected from about 4.0 to about 5.0. In some embodiments, the EN is a fraction of an integer selected from about 4.2 to about 4.8. In some embodiments, the EN is a fraction of an integer selected from about 4.3 to about 4.7. In some embodiments, the EN is selected from a value greater than 4.0, 4.1, 4.2, 4.3, 4.4, 4.5, 4.6, 4.7, 4.8, and 4.9. In some embodiments, the EN is selected from a value less than 4.1, 4.2, 4.3, 4.4, 4.5, 4.6, 4.7, 4.8, 4.9, and 5.0. In some embodiments, the EN is about 4.0, 4.2, 4.4, 4.6, 4.8, or 5.0.

In some embodiments, the EN is greater than or equal to about 5, such as an integer or fraction of an integer selected from about 5.0 to about 6.0. In some embodiments, the EN is a fraction of an integer selected from about 5.2 to about 5.8. In some embodiments, the EN is a fraction of an integer selected from about 5.3 to about 5.7. In some embodiments, the EN is selected from a value greater than 5.0, 5.1, 5.2, 5.3, 5.4, 5.5, 5.6, 5.7, 5.8, and 5.9. In some embodiments, the EN is selected from a value less than 5.1, 5.2, 5.3, 5.4, 5.5, 5.6, 5.7, 5.8, 5.9, and 6.0. In some embodiments, the EN is about 5.0, 5.2, 5.4, 5.4, 5.6, 5.8, or 6.0.

In some embodiments, the EN is greater than or equal to 1, such as an integer or fraction of an integer selected from about 1.0 to about 2.0. In some embodiments, the EN is a fraction of an integer selected from about 1.1 to about 1.7. In some embodiments, the EN is a fraction of an integer selected from about 1.1 to about 1.5. In some embodiments, the EN is selected from a value greater than 1.0, 1.1, 1.2, 1.3, 1.4, 1.5, 1.6, 1.7, 1.8, or 1.9. In some embodiments, the EN is selected from a value less than 1.2, 1.3, 1.4, 1.5, 1.6, 1.7, 1.8, 1.9, or 2.0. In some embodiments, the EN is about 1.0, 1.2, 1.4, 1.6, 1.8, or 2.0. In some embodiments, the EN is greater than or equal to 1, such as an integer or fraction of an integer selected from about 1.2 to about 2.2. In some embodiments, the EN is an integer or fraction of an integer selected from about 1.4 to about 2.0. In some embodiments, the EN is a fraction of an integer selected from about 1.5 to about 1.9. In some embodiments, the EN is selected from a value greater than 1.0, 1.1. 1.2, 1.3, 1.4, 1.5, 1.6, 1.7, 1.8, 1.9, 2.0, and 2.1. In some embodiments, the EN is selected from a value less than 1.2, 1.3, 1.4, 1.5, 1.6, 1.7, 1.8, 1.9, 2.0, 2.1, and 2.2. In some embodiments, the EN is about 1.0, 1.2, 1.4, 1.6, 1.8, 2.0, or 2.2.

In some embodiments, the EN is greater than or equal to 2, such as an integer or fraction of an integer selected from about 2.8 to about 3.8. In some embodiments, the EN is an integer or fraction of an integer selected from about 2.9 to about 3.5. In some embodiments, the EN is an integer or fraction of an integer selected from about 3.0 to about 3.4. In some embodiments, the EN is selected from a value greater than 2.0, 2.1, 2.2., 2.4, 2.5, 2.6, 2.7, 2.8, 2.9, 3.0, 3.1, 3.4, 3.5, 3.6, and 3.7. In some embodiments, the EN is selected from a value less than 2.2, 2.3, 2.4, 2.5, 2.6, 2.7, 2.8, 2.9, 3.0, 3.1, 3.2, 3.3, 3.4, 3.5, 3.6, 3.7, and 3.8. In some embodiments, the EN is about 2.0, 2.2, 2.4, 2.6, 2.8, 3.0, 3.2, 3.4, 3.6, or 3.8. Typically, base stocks and lubricant compositions exhibit certain lubricity, viscosity, and/or pour point characteristics. For example, in certain embodiments, suitable viscosity characteristics of the base oil may range from about 10 cSt to about 250 cSt at 40° C., and/or about 3 cSt to about 30 cSt at 100° C. In some embodiments, the compounds and compositions may exhibit viscosities within a range from about 50 cSt to about 150 cSt at 40° C., and/or about 10 cSt to about 20 cSt at 100° C.

In some embodiments, the estolide compounds and compositions may exhibit viscosities less than about 55 cSt at 40° C. or less than about 45 cSt at 40° C., and/or less than about 12 cSt at 100° C. or less than about 10 cSt at 100° C. In some embodiments, the estolide compounds and compositions may exhibit viscosities within a range from about 25 cSt to about 55 cSt at 40° C., and/or about 5 cSt to about 11 cSt at 100° C. In some embodiments, the estolide compounds and compositions may exhibit viscosities within a range from about 35 cSt to about 45 cSt at 40° C., and/or about 6 cSt to about 10 cSt at 100° C. In some embodiments, the estolide compounds and compositions may exhibit viscosities within a range from about 38 cSt to about 43 cSt at 40° C., and/or about 7 cSt to about 9 cSt at 100° C.

In some embodiments, the estolide compounds and compositions may exhibit viscosities less than about 120 cSt at 40° C. or less than about 100 cSt at 40° C., and/or less than about 18 cSt at 100° C. or less than about 17 cSt at 100° C. In some embodiments, the estolide compounds and compositions may exhibit a viscosity within a range from about 70 cSt to about 120 cSt at 40° C., and/or about 12 cSt to about 18 cSt at 100° C. In some embodiments, the estolide compounds and compositions may exhibit viscosities within a range from about 80 cSt to about 100 cSt at 40° C., and/or about 13 cSt to about 17 cSt at 100° C. In some embodiments, the estolide compounds and compositions may exhibit viscosities within a range from about 85 cSt to about 95 cSt at 40° C., and/or about 14 cSt to about 16 cSt at 100° C.

In some embodiments, the estolide compounds and compositions may exhibit viscosities greater than about 180 cSt at 40° C. or greater than about 200 cSt at 40° C., and/or greater than about 20 cSt at 100° C. or greater than about 25 cSt at 100° C. In some embodiments, the estolide compounds and compositions may exhibit a viscosity within a range from about 180 cSt to about 230 cSt at 40° C., and/or about 25 cSt to about 31 cSt at 100° C. In some embodiments, estolide compounds and compositions may exhibit viscosities within a range from about 200 cSt to about 250 cSt at 40° C., and/or about 25 cSt to about 35 cSt at 100° C. In some embodiments, estolide compounds and compositions may exhibit viscosities within a range from about 210 cSt to about 230 cSt at 40° C., and/or about 28 cSt to about 33 cSt at 100° C. In some embodiments, the estolide compounds and compositions may exhibit viscosities within a range from about 200 cSt to about 220 cSt at 40° C., and/or about 26 cSt to about 30 cSt at 100° C. In some embodiments, the estolide compounds and compositions may exhibit viscosities within a range from about 205 cSt to about 215 cSt at 40° C., and/or about 27 cSt to about 29 cSt at 100° C.

In some embodiments, the estolide compounds and compositions may exhibit viscosities less than about 45 cSt at 40° C. or less than about 38 cSt at 40° C., and/or less than about 10 cSt at 100° C. or less than about 9 cSt at 100° C. In some embodiments, the estolide compounds and compositions may exhibit a viscosity within a range from about 20 cSt to about 45 cSt at 40° C., and/or about 4 cSt to about 10 cSt at 100° C. In some embodiments, the estolide compounds and compositions may exhibit viscosities within a range from about 28 cSt to about 38 cSt at 40° C., and/or about 5 cSt to about 9 cSt at 100° C. In some embodiments, the estolide compounds and compositions may exhibit viscosities within a range from about 30 cSt to about 35 cSt at 40° C., and/or about 6 cSt to about 8 cSt at 100° C.

In some embodiments, the estolide compounds and compositions may exhibit viscosities less than about 80 cSt at 40° C. or less than about 70 cSt at 40° C., and/or less than about 14 cSt at 100° C. or less than about 13 cSt at 100° C. In some embodiments, the estolide compounds and compositions may exhibit a viscosity within a range from about 50 cSt to about 80 cSt at 40° C., and/or about 8 cSt to about 14 cSt at 100° C. In some embodiments, the estolide compounds and compositions may exhibit viscosities within a range from about 60 cSt to about 70 cSt at 40° C., and/or about 9 cSt to about 13 cSt at 100° C. In some embodiments, the estolide compounds and compositions may exhibit viscosities within a range from about 63 cSt to about 68 cSt at 40° C., and/or about 10 cSt to about 12 cSt at 100° C.

In some embodiments, the estolide compounds and compositions may exhibit viscosities greater than about 120 cSt at 40° C. or greater than about 130 cSt at 40° C., and/or greater than about 15 cSt at 100° C. or greater than about 18 cSt at 100° C. In some embodiments, the estolide compounds and compositions may exhibit a viscosity within a range from about 120 cSt to about 150 cSt at 40° C., and/or about 16 cSt to about 24 cSt at 100° C. In some embodiments, the estolide compounds and compositions may exhibit viscosities within a range from about 130 cSt to about 160 cSt at 40° C., and/or about 17 cSt to about 28 cSt at 100° C. In some embodiments, the estolide compounds and compositions may exhibit viscosities within a range from about 130 cSt to about 145 cSt at 40° C., and/or about 17 cSt to about 23 cSt at 100° C. In some embodiments, the estolide compounds and compositions may exhibit viscosities within a range from about 135 cSt to about 140 cSt at 40° C., and/or about 19 cSt to about 21 cSt at 100° C. In some embodiments, the estolide compounds and compositions may exhibit viscosities of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 32, 34, 36, 38, 40, 42, 44, 46, 48, 50, 55, 60, 65, 70, 75, 80, 85, 90, 95, 100, 110, 120, 130, 140, 150, 160, 170, 180, 190, 200, 210, 220, 230, 240, 250, 260, 270, 280, 290, 300, 350, or 400 cSt. at 40° C. In some embodiments, the estolide compounds and compositions may exhibit viscosities of about 1, 2, 3, 4, 5, 6, 7, 8, 9, 10, 11, 12, 13, 14, 15, 16, 17, 18, 19, 20, 21, 22, 23, 24, 25, 26, 27, 28, 29, and 30 cSt at 100° C. In some embodiments, estolides may exhibit desirable low-temperature pour point properties. In some embodiments, the estolide compounds and compositions may exhibit a pour point lower than about −25° C., about −35° C., −40° C., or even about −50° C. In some embodiments, the estolide compounds and compositions have a pour point of about −25° C. to about −45° C. In some embodiments, the pour point falls within a range of about −30° C. to about −40° C., about −34° C. to about −38° C., about −30° C. to about −45° C., −35° C. to about −45° C., 34° C. to about −42° C., about −38° C. to about −42° C., or about 36° C. to about −40° C. In some embodiments, the pour point falls within the range of about −27° C. to about −37° C., or about −30° C. to about −34° C. In some embodiments, the pour point falls within the range of about −25° C. to about −35° C., or about −28° C. to about −32° C. In some embodiments, the pour point falls within the range of about −28° C. to about −38° C., or about −31° C. to about −35° C. In some embodiments, the pour point falls within the range of about −31° C. to about −41° C., or about −34° C. to about −38° C. In some embodiments, the pour point falls within the range of about −40° C. to about −50° C., or about −42° C. to about −48° C. In some embodiments, the pour point falls within the range of about −50° C. to about −60° C., or about −52° C. to about −58° C. In some embodiments, the upper bound of the pour point is less than about −35° C., about −36° C., about −37° C., about −38° C., about −39° C., about −40° C., about −41° C., about −42° C., about −43° C., about −44° C., or about −45° C. In some embodiments, the lower bound of the pour point is greater than about −70° C., about −69° C., about −68° C., about −67° C., about −66° C., about −65° C., about −64° C., about −63° C., about −62° C., about −61° C., about −60° C., about −59° C., about −58° C., about −57° C., about −56° C., −55° C., about −54° C., about −53° C., about −52° C., −51, about −50° C., about −49° C., about −48° C., about −47° C., about −46° C., or about −45° C.

In addition, in certain embodiments, the estolides may exhibit decreased Iodine Values (IV) when compared to estolides prepared by other methods. IV is a measure of the degree of total unsaturation of an oil, and is determined by measuring the amount of iodine per gram of estolide (cg/g). In certain instances, oils having a higher degree of unsaturation may be more susceptible to creating corrosiveness and deposits, and may exhibit lower levels of oxidative stability. Compounds having a higher degree of unsaturation will have more points of unsaturation for iodine to react with, resulting in a higher IV. Thus, in certain embodiments, it may be desirable to reduce the IV of estolides in an effort to increase the oil's oxidative stability, while also decreasing harmful deposits and the corrosiveness of the oil.

In some embodiments, estolide compounds and compositions described herein have an IV of less than about 40 cg/g or less than about 35 cg/g. In some embodiments, estolides have an IV of less than about 30 cg/g, less than about 25 cg/g, less than about 20 cg/g, less than about 15 cg/g, less than about 10 cg/g, or less than about 5 cg/g. The IV of a composition may be reduced by decreasing the estolide's degree of unsaturation. This may be accomplished by, for example, by increasing the amount of saturated capping materials relative to unsaturated capping materials when synthesizing the estolides. Alternatively, in certain embodiments, IV may be reduced by hydrogenating estolides having unsaturated caps.

In certain embodiments the estolide compounds and compositions described herein may be used to prepare a grease composition. In certain embodiments, the grease composition further comprises at least one thickener. In certain embodiments, the estolide base oil is present in amounts of about 0 to about 100 wt. % of the grease composition, such as about 0.1 to about 99 wt. %. In certain embodiments, the estolide base oil is present in amounts of equal to or greater than about 3, 5, 10, 15, 25, 30, 50, 75, or 80 wt. % of the grease composition. In certain embodiments, the estolide base oil is present in amounts of about 0 to about 90, about 0 to about 80, about 0 to about 70, about 0 to about 60, about 0 to about 50, about 0 to about 40, about 0 to about 30, about 0 to about 20, or about 0 to about 10 wt. % of the grease composition. In certain embodiments, the estolide base oil is present in amounts of about 5 to about 95, about 10 to about 95, about 15 to about 95, about 25 to about 95, about 30 to about 95, or about 50 to about 95 wt. % of the grease composition. In certain embodiments, the estolide base oil is present in amounts of about 25 to about 95 wt. % of the composition, such as about 50 to about 75 wt % of the grease composition. In certain embodiments, the estolide base oil is present in amounts of about 5, 10, 15, 20, 25, 30, 35, 40, 45, 50, 55, 60, 65, 70, 75, 80, 85, 90, 95, or 100 wt. % of the grease composition. In certain embodiments, the estolide base oil is present in amounts of about 50, 52, 54, 56, 58, 60, 62, 64, 66, 68, 70, 72, 74, 76, 78, 80, 82, 84, 86, 88, 90, 92, 94, 96, or 98 wt. % of the grease composition.

In certain embodiments, the at least one thickener is present in the range of about 0 to about 30 wt % or more, such as from about 1 to about 30 wt %, or from about 5 to about 15 wt %, of the grease composition. In certain embodiments, the thickener is present in amounts equal to or greater than about 1, 2, 3, 4, 5, 6, 7, 8, 9, 10, 11, 12, 13, 14, 15, 16, 17, 18, 19, 20, 21, 22, 23, 24, 25, 26, 27, 28, or 29 wt. % of the grease composition. In certain embodiments, the thickener is present in amounts equal to or less than about 2, 3, 4, 5, 6, 7, 8, 9, 10, 11, 12, 13, 14, 15, 16, 17, 18, 19, 20, 21, 22, 23, 24, 25, 26, 27, 28, 29, or 30 wt. % of the grease composition. In certain embodiments, the grease composition comprises about 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5 or 16 wt. % of at least one thickener.

In certain embodiments, the at least one thickener is one or more thickener selected from metal soaps such as lithium soaps (simple or complex), aluminum soaps (simple or complex), calcium soaps (simple or complex), sodium soaps (simple or complex), barium soaps (simple or complex), polyureas and polyurea complexes, triureas, diureas, fluorocarbon resin powder, graphite, silica, fumed silica, hydrocarbon nanotubes, asphaltics, and combinations thereof. In certain embodiments, the thickener is silica-based. In certain embodiments, the thickener is a fumed silica (e.g., hydrophobic or hydrophilic), such as the synthetic amorphous pyrogenic silica Aerosil® marketed by Nippon Aerosil Co., Ltd.

In certain embodiments, the at least one thickener is the reaction product of at least one metal-based compound and at least one carboxylic acid or carboxylic acid ester. In certain embodiments, the at least one metal-based material is selected from metal hydroxides, metal carbonates, metal bicarbonates, and metal oxides. In certain embodiments, the at least one metal-based material is selected from alkali metals and alkaline earth metals. In certain embodiments, the at least one carboxylic acid is a $C_1$-$C_{40}$ fatty acid. Exemplary alkali metals include, but are not limited to, lithium, sodium, and potassium. Exemplary alkaline earth metals include, but are not limited to, magnesium, calcium, and barium. Exemplary metal hydroxides include, but are not limited to, calcium hydroxide, lithium hydroxide, potassium hydroxide, and sodium hydroxide. Exemplary carboxylic acids include, but are not limited to, acetic acid, propionic acid, butyric acid, pentanoic acid, caprylic acid, capric acid, lauric acid, myristic acid, palmitic acid, stearic acid, oleic acid, 6-hydroxystearic acid, 9,10-dihydroxystearic acid, 12-hydroxystearic acid, 14-hydroxystearic acid, and ricinoleic acid.

In certain embodiments, the at least one thickener is a metal soap thickener prepared from an alkali base and a fat or fatty acids. The fatty materials may be derived from any natural or synthetic source. The alkali base may comprise one or more alkali hydroxides, such as lithium hydroxide, calcium hydroxide, aluminum hydroxide, or sodium hydroxide. Exemplary simple soaps include, but are not limited to, soaps prepared from one fatty acid and one metal hydroxide. Exemplary simple soaps may comprise the metallic salt of a long-chain fatty acid. Exemplary complex soaps include, but are not limited to, soaps prepared from simple soaps mixed with a complexing agent. Exemplary complexing agents may include, but are not limited to, the metallic salt of a short-chain organic acid such as acetic acid.

In certain embodiments, the at least one thickener is a simple lithium soap or a lithium complex soap. Exemplary lithium soaps include, but are not limited to, lithium soaps of at least one hydroxy fatty acid, such as a $C_1$ to $C_{40}$ fatty acid, wherein the fatty acid is of the formula HO—C(O)—alkyl. In certain embodiments, the lithium component is selected from a lithium compound of (i) a aliphatic or cycloaliphatic dicarboxylic acid, such as a $C_1$ to $C_{24}$ aliphatic or cycloaliphatic dicarboxylic acid, or an alkyl ester thereof (such as a $C_1$ to $C_{10}$ alkyl ester); or (ii) a hydroxy carboxylic acid, such as a $C_1$ to $C_{24}$ hydroxy carboxylic acid, or an alkyl ester thereof (such as a $C_1$ to $C_{10}$ alkyl ester); or a combination thereof. In certain embodiments, the lithium component is a lithium salt of boric acid.

In certain embodiments, the at least one thickener is selected from simple and complex basic aluminum soaps. By "complex basic aluminum soaps" is meant that the aluminum soap molecule contains at least one hydroxy or carboxylate anion for each aluminum cation, and at least two dissimilar anions substantially hydrocarbonaceous in character. By "substantially hydrocarbonaceous anions" is meant those anions which are composed mainly of hydrogen and carbon, and include such anions which contain, in addition, minor amounts of, for example, nitrogen and/or oxygen-containing substituents. Examples of "substantially hydrocarbonaceous anions" include anions comprising an alkyl. Examples of thickeners include aluminum laurate, aluminum soap oleate, aluminum stearate, aluminum benzoate stearate, aluminum benzoate oleate, aluminum benzoate 12-hydroxy stearate, aluminum toluate stearate, aluminum benzoate naphthenate, aluminum benzoate hydrogenated rosin, aluminum benzoate sulfonate, aluminum azelate stearate, aluminum phosphate benzoate stearate, and aluminum benzoate hydroxy stearate.

In certain embodiments, the at least one thickener is a urea-type compound. In certain embodiments, the at least one thickener comprises diureas. In certain embodiments, the at least one thickener comprises polyureas. In certain embodiments, the diureas and polyureas may be formed, for example, by reacting (a) an alkylamine or alkenylamine; (b) an alkylenediamine, polyoxyalkylenediamine, or cycloalkylenediamine; (c) a cycloalkylamine; and (d) an aryl-containing-diisocyante or alkyldiisocyanate. In certain embodiments, the at least one thickener is a mixture of diureas and polyureas, and wherein the diureas and polyureas are formed by the reaction of oleylamine, ethylenediamine, cyclohexylamine, and toluene diisocyanate.

In certain embodiments, the at least one thickener is a mixture comprising (a) one or more urea-type compounds; (b) one or more fatty acid metal salts; and (c) at least one type of amide compound selected from the group comprised of aliphatic amides and aliphatic bisamides shown by the general formulae $R_1CONH_2$ and $R_1CONHR_2NHCOR_1$, wherein $R_1$ denotes a saturated or unsaturated $C_{15}$ to $C_{17}$ alkyl and $R_2$ denotes a methylene group or an ethylene group.

In certain embodiments, the at least one thickener is a perfluorocarbon resin selected from polytetrafluoroethylene (PTFE), tetrafluoroethylene-perfluoroalkylvinyl ether copolymer (PFA), and tetrafluoroethylene-hexafluoropropylene copolymer (FEP). In one example, the at least one thickener is polytetrafluoroethylene (PTFE).

In certain embodiments, the grease composition further comprises at least one antioxidant in the range of about 0 to about 10 wt. % or more, such as about 0 to about 5 wt %, or from about 0.2 to about 2 wt %. In some embodiments, the at least one antioxidant is present in amounts of about 1, 2, 3, 4, 5, 6, 7, 8, 9, or 10 wt. %, or about 0.2, 0.4, 0.6, 0.8, 1, 1.2, 1.4, 1.6, 1.8, or 2.0 wt. %. Exemplary antioxidants include, but are not limited to, one or more organic compounds containing nitrogen such as organic amines, sulfides, hydroxy sulfides, phenols, alone or in combination with one or more metals like zinc, tin, and barium. In certain embodiments, the at least one antioxidant is a sterically hindered phenol. The phenol may be alkylated, wherein the alkyl group(s) are branched or linear and may contain from 1 to about 24 carbon atoms. In certain embodiments, the alkylated phenol comprises one or more $C_4$ to $C_{18}$ or $C_1$ to $C_{12}$ alkyl groups. For example, in certain embodiments, the phenol may be butylated, such as with two t-butyl groups. When the t-butyl groups occupy the 2- and 6-positions, the phenol may be sterically hindered. In addition, in certain embodiments, the phenols may have additional substitution in the form of a hydrocarbyl group, or a bridging group between two such aromatic groups. In certain embodiments, for example, bridging groups in the para position may include, for example, —$CH_2$— or —$CH_2OCH_2$—.

In certain embodiments, the at least one antioxidant is selected from diphenylamines. Exemplary antioxidants include, but are not limited to, phenyl-alpha-naphthyl amine and derivatives, bis(alkylphenyl)amine, N,N-diphenyl-p-phenylenediamine, 2,2,4-trimethyldihydroquinoline oligomer, bis(4-isopropylaminophenyl)-ether, N-acyl-p-aminophenol, N-acylphenothiazines, ethylenediamine tetraacetic acid, alkylphenol-formaldehyde-amine polycondensates, alkylated diphenyl amines (ADPA) where, for example, the branched or unbranched alkyl group(s) contain from 1 to 24 or 1 to 12 carbon atoms, unsubstituted phenothiazines, substituted and unsubstituted quinolines where, for example, the substituents are branched or unbranched alkyl groups of 1 to 10 carbon atoms, zinc diamyl dithiocarbamate (ZDDC), and butylated hydroxyl toluene (BHT). In certain embodiments, the at least one antioxidant may be selected from free radical-scavenging agents such as zinc dialkyl-1-dithiophosphate (ZDDP).

In certain embodiments, the grease composition further comprises at least one polyhydroxylated compound. In certain embodiments, including the at least one polyhydroxylated compound improves the low shear stability of the grease. In certain embodiments, the at least one polyhydroxylated compound is a polyhydroxylated ester. In certain embodiments, the at least one polyhydroxylated compound is pentaerythritol monooleate. The improvement in low shear stability may be demonstrated by a lower percent softening measured using ASTM D1831-00 (Reapproved 2006).

In certain embodiments, the grease composition comprises at least one preservative. Exemplary preservatives include, but are not limited to fungicides and antibacterial agents. In certain embodiments, the grease composition comprises at least one colorant. In certain embodiments, the grease composition comprises at least one shear stability additive. In certain embodiments, the grease composition comprises at least one anti-wear/anti-weld and/or extreme-pressure (EP) agents. Exemplary anti-wear/anti-weld and/or EP agents include, but are not limited to, carbamates, esters, molybdenum complexes, alkali-metal borates, antimony dialkyl dithiocarbamates (ADDC) having, for example, branched or unbranched $C_1$ to $C_{50}$ alkyl groups, dihydrocarbyl polysulfide, and phosphorus compounds (e.g., phosphates, phosphites, phosphonates, phosphinates) such as aryl phosphates, alkyl phosphates having, for example, branched or unbranched $C_6$ to $C_{10}$ alkyl groups, amine phosphates, and amine salts of acid phosphates. In certain embodiments, the grease composition may comprise one or more metal thiophosphates, such as zinc dialkyl-1-dithiophosphates (ZDDP) (primary alkyl, secondary alkyl, and aryl type), a phosphoric acid ester or salt thereof, or a phosphorous-containing ester, ether, or amide. In certain embodiments, the at least one anti-wear agent is present in the range of about 0 to about 15 wt. % or more, such as about 1 to about 5 wt %. In some embodiments, the at least one anti-wear agent is present in amounts of about 1, 2, 3, 4, 5, 6, 7, 8, 9, 10, 11, 12, 13, 14, or 15 wt. %.

In certain embodiments, the at least one anti-wear agent is a neutralized phosphate. In certain embodiments, a suitable neutralized alkyl phosphate ester component may include a component containing a mixture of mono- and di-$C_4$ to $C_8$-alkyl phosphate esters and/or polyphosphate esters that have been neutralized with a non-branched chain amine. In certain embodiments, the non-branched chain amines may be selected from tetramethylnonylamines, $C_{11}$ to $C_{14}$ alkylamines, and the like. In certain embodiments, the neutralized alkyl phosphate agent will be a non-sludge promoting antiwear additive. In certain embodiments, the neutralized dialkyl phosphate is neutralized with a $C_{12}$-$C_{14}$ t-alkyl primary amine.

In certain embodiments, one or more optional anti-wear/anti-weld and/or EP additives may be selected from boron compounds, diphenyl sulfide, methyl trichlorostearate, chlorinated naphthalene, fluoroalkylpolysiloxane, lead naphthenate, neutralized phosphates, dithiophosphates, and sulfur-free phosphates. In certain embodiments, the at least one EP agents that may be used may include one or more sulfur or chlorosulfur EP agents, chlorinated hydrocarbon EP agents, phosphorus EP agents, or mixtures of two or more thereof. Examples of such EP agents include, but are not limited to, chlorinated wax, organic sulfide or polysulfide, such as benzyldisulfide, bis-(chlorobenzyl) disulfide, dibutyl tetrasulfide, sulfurized fats, sulfurized oils, sulfurized glyceridic oils, sulfurized fatty acids or fatty acid esters, such as sulfurized sperm oil and sulfurized alkyl esters of oleic acid, sulfurized alkylphenols, sulfurized dipentene, sulfurized terpene, and sulfurized Diels-Alder adducts. Other exemplary EP agents include phosphosulfurized hydrocarbons, such as the reaction product of phosphorus sulfide with turpentine or methyl oleate, phosphorus esters such as the dihydrocarbon and trihydrocarbon phosphites, i.e., dibutyl phosphite, diheptyl phosphite, dicyclohexyl phosphite, pentylphenyl phosphite; dipentylphenyl phosphite, tridecyl phosphite, distearyl phosphite and polypropylene substituted phenol phosphite; metal thiocarbamates such as zinc dioctyldithiocarbamate and barium heptylphenol diacid, zinc dicyclohexyl phosphorodithioate and the zinc salts of a phosphorodithioic acid combination.

In certain embodiments, at least one other anti-wear, antigalling, or solid film lubricant additives may be employed, such as tungsten disulfide, boron nitride, monoaluminum phosphate, tantalum sulfide, iron telluride, zirconium sulfide, zinc sulfide, zirconium nitride, zirconium chloride, bismuth oxide, bismuth sulfate, calcium sulfate, calcium acetate, barium fluoride, lithium fluoride, chromium boride, chromium chloride, sodium tetraborate, and tripotassium borate. The at least one other additive may be added to the lubricant in a suitable form, for example, a powder or liquid. Under operating conditions, these additives may form reaction products or derivatives that exhibit antiwear, antigalling, or lubricating properties. Alternatively, precursors to the at least one other additive may be added to the lubricant, which react under operating conditions to form an effective amount of the additive. In certain embodiments, such additives may be present in grease formulations at from about 0 wt. % to about 5 wt. % or more, such as from about 2 to about 4 wt. %. In some embodiments, the at least one other additive may be present in amounts of about 1, 2, 3, 4, or 5 wt. %, or about 2, 2.2, 2.4, 2.6, 2.8, 3, 3.2, 3.4, 3.6, 3.8, or 4 wt. %.

In certain embodiments, the grease compositions may comprise at least one ferrous/rust inhibitor selected from polyoxyethylene lauryl ether, polyoxyethylene higher alcohol ether, polyoxyethylene nonyl phenyl ether, polyoxyethylene octyl phenyl ether, polyoxyethylene octyl stearyl ether, polyoxyethylene oleyl ether, polyoxyethylene sorbitol monostearate, polyoxyethylene sorbitol mono-oleate, stearic acid and other fatty acids, dicarboxylic acids, metal soaps, fatty acid amine salts, metal salts of heavy sulfonic acid, partial carboxylic acid ester of polyhydric alcohol, phosphoric ester, polyethylene glycol mono-oleate, borated esters, amines, ethers, alcohols metal sulfonate salts, alkyl and aryl succinic acids, alkyl and aryl succinate esters, amides, and other related derivatives. In certain embodiments, the at least one rust inhibitor comprises a metallic salt of a polybasic acid, a polyvalent alcohol in which a part of a hydroxyl group is blocked, or at least one compound selected from an organic sulfonate and a fatty acid. In certain embodiments, the at least one ferrous/rust inhibitor may be present in grease formulations from about 0 wt. % to about 15 wt. % or more, such as about 1 to about 5 wt. %. In some embodiments, the at least one ferrous/rust inhibitor is present in amounts of about 1, 2, 3, 4, 5, 6, 7, 8, 9, 10, 11, 12, 13, 14, or 15 wt. %.

In certain embodiments, it may be desirable to attain extreme pressure properties, anti-wear qualities, and/or friction reduction properties, as well as any elastomeric compatibility which may be required. Accordingly, in some embodiments, the grease composition further comprises at least one nanoparticle additive. In certain embodiments, the at least one nanoparticle additive is selected from: a carbonate of a Group 1a alkali metal; a carbonate of a Group 2a alkaline earth metal; a sulfate of a Group 1a alkali metal or a Group 2a alkaline earth metal; a phosphate of a Group 1a alkali metal or Group 2a alkaline earth metal; a carboxylate of a Group 1a alkali metal; and a carbonate of a Group 2a alkaline earth metal. In certain embodiments, the average nanoparticle size is less than about 100 nanometers.

In certain embodiments, the grease composition further comprises at least one oil-soluble organic molybdenum complex, oil-soluble organic zinc compound of dithiocarbamic acid, oil-soluble organic zinc compound of dithiophosphoric acid, or inorganic sulphur compound. In certain embodiments, the grease composition further comprises at least one oil-soluble amine salt of a phosphorus compound, such as phosphate and/or monthiophosphate. In certain embodiments, the grease composition further comprises at least one of dibutylthiophosphate and dibutylphosphate salts, such as an oleylamine salt of a mixture of dibutylthiophosphate and dibutylphosphate. In certain embodiments, the grease composition further comprises an olefin or a sulfurized olefin, such as polybutene or sulfurized polybutene.

In certain embodiments, the grease composition further comprises at least one inorganic filler selected from metal oxides, metal nitrides, metal carbides, clay minerals, and diamond. In certain embodiments, the at least one inorganic filler has an average particle size of less than about 2 µm.

In certain embodiments, the grease composition further comprises at least one thermally conductive additive. Exemplary thermally conductive additives include, but are not limited to, aluminum nitride, silica, alumina, metal silicon, boron nitride, and zinc oxide. In certain embodiments, the at least one thermally conductive grease further comprises at least one electroconductive filler such as graphite, carbon black, carbon nanotubes, and metal powder.

In certain embodiments, the grease composition may be employed in a solid stick grease form. For example, in certain embodiments, the grease may be prepared by admixing the grease composition within at least one resin. In certain embodiments, the at least one resin is a thermosetting plasticizer selected from branched phthalate, linear phthalate, branched adipate, mixed dibasic acid polyester, trimellitate, polyester glutarate, polyester adipate, citrate, polymeric plasticizer, sebacates, adipic acid polyesters, dioctyl adipate, and a soybean-based plasticizer. In certain embodiments, the at least one resin is selected from ultra-high-molecular-weight polyolefin powders having, for example, a mean molecular weight of about $1\times10^6$ to about $5\times10^6$. In certain embodiments, the at least one resin comprises a polyamide, a polyacetal, or combinations thereof.

In certain embodiments, the grease composition may comprise at least one tackifier. The at least one tackifier may be added to increase the "stringiness" and/or "stickiness" of the resulting grease composition. Exemplary tackifiers include, but are not limited to natural oils such as blown castor oil, polybutene, polymethacrylates, dispersion-type polymethacrylates, olefin polymers, dispersion-type olefin polymers, and thermoplastic elastomers.

In certain embodiments, the grease compositions comprise at least one further property-enhancing additive selected from oiliness agents; flame retardants such as calcium oxide; corrosion inhibitors such as alkali metal nitrite, e.g. sodium nitrite; oil bleed inhibitors such as polybutene; foam inhibitors such as alkyl methacrylate polymers and dimethyl silicone polymers; metal deactivators such as disalicylidene propylenediamine, triazole derivatives, thiadiazole derivatives, mercaptobenzimidazoles; complex organic nitrogen, and amines; friction modifiers; thermal conductive additives; electroconductive agents; elastomeric compatibilizers; viscosity modifiers such as polymethacrylate type polymers, ethylene-propylene copolymers, styrene-isoprene copolymers, hydrated styrene-isoprene copolymers, polyisobutylene, and dispersant type viscosity modifiers; pour point depressants such as polymethyl methacrylate; multifunctional additives such as sulfurized oxymolybdenum dithiocarbamate, sulfurized oxymolybdenum organo phosphorodithioate, oxymolybdenum monoglyceride, oxymolybdenum diethylate amide, amine-molybdenum complex compound, and sulfur-containing molybdenum complex compound; and the like. In certain embodiments, the grease composition comprises the at least one further property-enhancing additive in an amount sufficient to provide the desired effects.

In certain embodiments, the grease composition is prepared by mixing the base oil matrix with the at least one thickener and optional components and/or additives in a vessel. Exemplary vessels or mixing devices suitable for mixing include, but are not limited to, kitchen mixers, grease making kettles, inline mixing chambers, and contactor kettles. In certain embodiments, the mixture is then agitated, optionally with heating (e.g., from about 25° C. to about 250° C.) depending on the thickener(s) used. In certain embodiments, after mixing, the mixture of the base oil, thickener, and optional components/additives is sheared for a time sufficient to reduce substantially all of the thickener particles to below a desired size (e.g., 500 microns). In various embodiments, any suitable shearing device may be employed such as static mixers, mechanical systems having counter rotating paddles, gaulin homogenizers, Chalotte mills, Morehouse mills, cone and stator mills, roll mills, and the like. In certain embodiments, shearing is performed at the temperature to which the mixture has been heated.

After mixing and optional shearing, in certain embodiments, the base oil/thickener mixture is further processed to form a grease. In certain embodiments, the mixture is heated (e.g., to a temperature of about 125 to about 175° C.), then subsequently milled to form a homogeneous grease. In certain embodiments, milling is conducted at temperatures ranging from about 10° C. to about 175° C. In certain embodiments, milling is conducted for a least a period of the time at about 10° C., 20° C., 30° C., 40° C., 50° C., 60° C., 70° C., 80° C., 90° C., 100° C., 110° C., 120° C., 130° C., 140° C., 150° C., 160° C., or 170° C. In certain embodiments, additional standard grease manufacturing procedures such as filtering and de-aerating the grease may be employed.

In certain embodiments, the grease composition may be characterized as having low noise characteristics. In certain embodiments, the grease with low noise characteristics exhibits a peak average value of less than about 15 microns/second when tested using a modified bearing vibration level tester (an anderometer) to test for grease noise, such as using a BeQuiet grease noise tester manufactured by the SKF Group of Sweden. Other grease noise testers can also be used, including, but not limited to, GRW noise testing instruments from GRW Gebr. Reinfurt GmbH & Co KG and the FAG-series instruments from the Schaeffler Group. In certain embodiments, a grease composition comprising at least one estolide base oil exhibits a peak average value of less than about 15 microns/second when tested using BeQuiet grease noise tester. In certain embodiments, the grease composition exhibits a value of less than 10 microns/second.

In certain embodiments, the grease composition also displays a high resistance to high temperature and operates effectively in oxidative or chemically aggressive environments. In certain embodiments, when measuring using pressure differential scanning colorimetry (PDSC) under oxygen at 20 MPa, the grease composition shows a flat thermogram and stability up to about 250° C. In certain embodiments, the grease composition shows stability up to about 300° C. PDSC can be measured using either ASTM D5483-05 or ASTM D6186-98 (R 2003).

In certain embodiments, the grease exhibits low shear rate and excellent heat resistance. Shear stability is the ability of a grease to resist a change in consistency during mechanical working. Under high rates of shear, grease structures tend to change in consistency. In certain embodiments, greases with poor low shear stability will quickly break down, resulting in a thinning of the grease. In certain embodiments, a grease with good low shear stability, therefore, will not soften excessively under prolonged low shear stress. A large difference between the prolonged worked penetration (Full Scale, P100,000 by ASTM D217-02) and the worked penetration (½ Scale, P60 by ASTM D1403-02) of a grease indicates poor low shear stability. In certain embodiments, the grease composition displays less than about 25% difference between prolonged worked penetration and worked penetration. In certain embodiments, the difference is less than about 20%. In certain embodiments, the difference is less than about 15%. In certain embodiments, the difference is less than about 10%. In certain embodiments, the difference is less than about 5%.

In certain embodiments, the heat resistance of a grease may be measured by its Dropping Point, wherein good heat resistance is associated with a high Dropping point. Exemplary Dropping Point tests include, but are not limited to, Dropping Point tests conducted according to ASTM D2265-06. In certain embodiments, the grease composition has a Dropping Point of at least about 150° C. In certain embodiments, the Dropping Point is at least about 175° C. In certain embodiments, the Dropping Point is at least about 200° C. In certain embodiments, the Dropping Point is at least about 215° C. In certain embodiments, the Dropping Point is at least about 225° C. In certain embodiments, the Dropping Point is at least about 240° C. In certain embodiments, the Dropping Point is at least about 250° C.

In certain embodiments, the silica-based grease compositions may be useful wide-temperature applications requiring water and salt-water resistance. Such compositions may be translucent in color for various applications such as dampening, electrical connectors, and sliding applications. For electrical applications, electrically-conductive additives such as carbon black may be added.

In certain embodiments, the grease composition comprises at least one lithium-based thickener, such as a simple or complex lithium-based soap. In certain embodiments, the grease composition comprising at least one lithium-based thickener may exhibit good water resistance, mechanical stability, and/or high-temperature performance. In certain embodiments, the grease composition comprising at least one lithium-based thickener exhibits dropping points that exceed about 150° C., about 200° C., about 250° C., or even about 300° C.

In certain embodiments, the grease composition is used as a grease for parts and applications including, but not limited to, bearings, constant velocity joints, constant velocity gears, variable velocity gears, iron-making equipment, and high-speed bearings. Exemplary applications include, but are not limited to, use for rolling bearings of electric component parts of a car such as an alternator, an electromagnetic clutch for a car air conditioner, an intermediate pulley, an electromotive fan motor, a fan clutch, and electric auxiliaries. In certain embodiments, the grease composition can be tailored for the specific end-use applications, including those operating at low-temperature to high-temperature ranges.

In certain embodiments, the grease composition is employed in a solid stick grease form. In certain embodiments, the solid stick grease composition is used between two metal surfaces in sliding and rolling-sliding contact. Exemplary uses of the grease composition in a solid stick form include, but are not limited to, use with steel wheel-rail systems including mass transit and freight systems.

In certain embodiments, the grease composition is employed in a semi solid-like form. In certain embodiments, the semi solid-like form grease composition contains at least one liquid crystalline compound for use as lubrication grease for machine components. Exemplary uses of the semi solid-like form grease composition include, but are not limited to, use with precision equipment, mobile telephones and computer hard disk drives.

In certain embodiments, the grease composition is used in electroconductive applications. In certain embodiments, the grease composition comprises at least one electroconductive filler material. Exemplary uses of the grease composition include, but are not limited to, use in, bearings of electric motors, automobile electrical parts, an alternator/an intermediate pulley (engine accessories), or an electromagnetic clutch for a car air conditioner.

In certain embodiments, the grease compositions are suitable for use in applications where said grease composition is likely to be exposed to petroleum and/or petroleum-containing streams. In certain embodiments, the grease compositions are substantially insoluble in petroleum and/or hydrocarbonaceous streams. In certain embodiments, the grease compositions are only partially soluble in petroleum and/or hydrocarbonaceous streams. Exemplary uses of grease compositions that are substantially insoluble or partially soluble in petroleum and/or hydrocarbonaceous streams include, but are not limited to, use in petroleum-industry equipment, such as pipelines (e.g., valve greases), jackleg greases, and wireline greases, wherein exposure to hydrocarbonaceous chemicals will not result in the dissolution and removal of said greases. In certain embodiments, the grease composition has a solubility in hydrocarbonaceous streams that is less than about 1 g/L when measured at 25° C. and atmospheric pressure, such as less than about 500 mg/L, 250 mg/L, 100 mg/L, 50 mg/L, 25 mg/L, 10 mg/L, 5 mg/L, 1 mg/L, 0.5 mg/L, or even 0.1 mg/L. In certain embodiments, the grease composition described herein may have a solubility in hydrocarbonaceous streams in the range of about 0 to about 500 mg/L, such as about 0 to about 250 mg/L, about 0 to about 100 mg/L, about 0.1 to about 50 mg/L, about 0.1 to about 25 mg/L, about 0.1 to about 10 mg/L, or about 0.1 to about 5 mg/L.

The present disclosure further relates to methods of making estolides according to Formula I, II, and III. By way of example, the reaction of an unsaturated fatty acid with an organic acid and the esterification of the resulting free acid estolide are illustrated and discussed in the following Schemes 1 and 2. The particular structural formulas used to illustrate the reactions correspond to those for synthesis of compounds according to Formula I and III; however, the methods apply equally to the synthesis of compounds according to Formula II, with use of compounds having structure corresponding to $R_3$ and $R_4$ with a reactive site of unsaturation.

As illustrated below, compound 100 represents an unsaturated fatty acid that may serve as the basis for preparing the estolide compounds described herein.

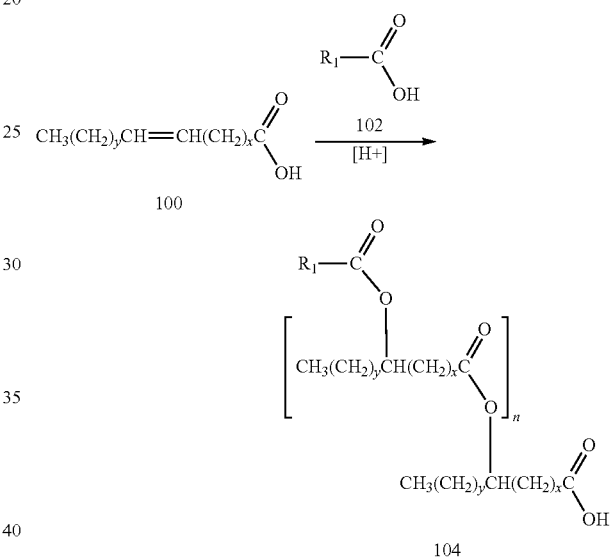

In Scheme 1, wherein x is, independently for each occurrence, an integer selected from 0 to 20, y is, independently for each occurrence, an integer selected from 0 to 20, n is an integer greater than or equal to 1, and $R_1$ is an optionally substituted alkyl that is saturated or unsaturated, and branched or unbranched, unsaturated fatty acid 100 may be combined with compound 102 and a proton from a proton source to form free acid estolide 104. In certain embodiments, compound 102 is not included, and unsaturated fatty acid 100 may be exposed alone to acidic conditions to form free acid estolide 104, wherein $R_1$ would represent an unsaturated alkyl group. In certain embodiments, if compound 102 is included in the reaction, $R_1$ may represent one or more optionally substituted alkyl residues that are saturated or unsaturated and branched or unbranched. Any suitable proton source may be implemented to catalyze the formation of free acid estolide 104, including but not limited to homogenous acids and/or strong acids like hydrochloric acid, sulfuric acid, perchloric acid, nitric acid, triflic acid, and the like.

Scheme 2

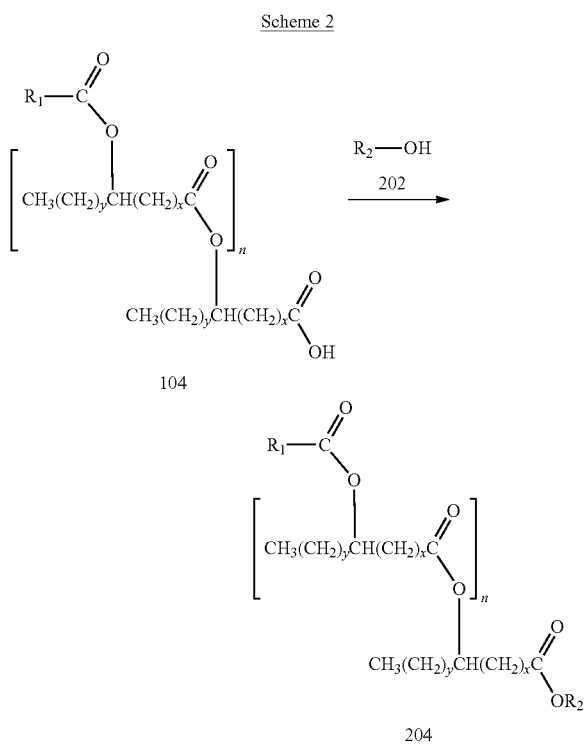

Similarly, in Scheme 2, wherein x is, independently for each occurrence, an integer selected from 0 to 20, y is, independently for each occurrence, an integer selected from 0 to 20, n is an integer greater than or equal to 1, and $R_1$ and $R_2$ are each an optionally substituted alkyl that is saturated or unsaturated, and branched or unbranched, free acid estolide 104 may be esterified by any suitable procedure known to those of skilled in the art, such as acid-catalyzed reduction with alcohol 202, to yield esterified estolide 204. Other exemplary methods may include other types of Fischer esterification, such as those using Lewis acid catalysts such as $BF_3$.

As discussed above, in certain embodiments, the estolides described herein may have improved properties which render them useful as base stocks for lubricant applications, including biodegradable greases. Such grease products may be particularly suitable for lubricating products and processes used in environmentally-sensitive settings, such as forests and marine environments, where biodegradability and toxicity are of concern (e.g., logging and farming machinery, wind turbines, marine vessels). In certain embodiments, the nontoxic nature of certain estolide greases may also make them suitable for use as lubricants in the food industry.

In certain embodiments, it may be desirable to prepare grease compositions comprising an estolide base stock. For example, in certain embodiments, the estolides described herein may be blended with one or more additives selected from polyalphaolefins, synthetic esters, polyalkylene glycols, mineral oils (Groups I, II, and III), dropping point modifiers, viscosity modifiers, anti-corrosives, antiwear agents, detergents, dispersants, colorants, antifoaming agents, and demulsifiers, to form a grease composition. In addition, or in the alternative, in certain embodiments, the estolides described herein may be co-blended with one or more synthetic or petroleum-based oils to provide a co-blended base oil suitable for use in grease compositions.

In all of the foregoing examples, the compounds described may be useful alone, as mixtures, or in combination with other compounds, compositions, and/or materials.

Methods for obtaining the novel compounds described herein will be apparent to those of ordinary skill in the art, suitable procedures being described, for example, in the examples below, and in the references cited herein.

EXAMPLES

Analytics

Nuclear Magnetic Resonance:

NMR spectra were collected using a Bruker Avance 500 spectrometer with an absolute frequency of 500.113 MHz at 300 K using $CDCl_3$ as the solvent. Chemical shifts were reported as parts per million from tetramethylsilane. The formation of a secondary ester link between fatty acids, indicating the formation of estolide, was verified with 1H NMR by a peak at about 4.84 ppm.

Estolide Number (EN):

The EN was measured by GC analysis. It should be understood that the EN of a composition specifically refers to EN characteristics of any estolide compounds present in the composition. Accordingly, an estolide composition having a particular EN may also comprise other components, such as natural or synthetic additives, other non-estolide base oils, fatty acid esters, e.g., triglycerides, and/or fatty acids, but the EN as used herein, unless otherwise indicated, refers to the value for the estolide fraction of the estolide composition.

Iodine Value (IV):

The iodine value is a measure of the degree of total unsaturation of an oil. IV is expressed in terms of centigrams of iodine absorbed per gram of oil sample. Therefore, the higher the iodine value of an oil the higher the level of unsaturation is of that oil. The IV may be measured and/or estimated by GC analysis. Where a composition includes unsaturated compounds other than estolides as set forth in Formula I, II, and III, the estolides can be separated from other unsaturated compounds present in the composition prior to measuring the iodine value of the constituent estolides. For example, if a composition includes unsaturated fatty acids or triglycerides comprising unsaturated fatty acids, these can be separated from the estolides present in the composition prior to measuring the iodine value for the one or more estolides.

Acid Value:

The acid value is a measure of the total acid present in an oil. Acid value may be determined by any suitable titration method known to those of ordinary skill in the art. For example, acid values may be determined by the amount of KOH that is required to neutralize a given sample of oil, and thus may be expressed in terms of mg KOH/g of oil.

Gas Chromatography (GC):

GC analysis was performed to evaluate the estolide number (EN) and iodine value (IV) of the estolides. This analysis was performed using an Agilent 6890N series gas chromatograph equipped with a flame-ionization detector and an autosampler/injector along with an SP-2380 30 m×0.25 mm i.d. column.

The parameters of the analysis were as follows: column flow at 1.0 mL/min with a helium head pressure of 14.99 psi; split ratio of 50:1; programmed ramp of 120-135° C. at 20° C./min, 135-265° C. at 7° C./min, hold for 5 min at 265° C.; injector and detector temperatures set at 250° C.

Measuring EN and IV by GC:

To perform these analyses, the fatty acid components of an estolide sample were reacted with MeOH to form fatty acid methyl esters by a method that left behind a hydroxy group at sites where estolide links were once present. Standards of fatty acid methyl esters were first analyzed to establish elution times.

Sample Preparation:

To prepare the samples, 10 mg of estolide was combined with 0.5 mL of 0.5M KOH/MeOH in a vial and heated at 100° C. for 1 hour. This was followed by the addition of 1.5 mL of 1.0 M $H_2SO_4$/MeOH and heated at 100° C. for 15 minutes and then allowed to cool to room temperature. One (1) mL of $H_2O$ and 1 mL of hexane were then added to the vial and the resulting liquid phases were mixed thoroughly. The layers were then allowed to phase separate for 1 minute. The bottom $H_2O$ layer was removed and discarded. A small amount of drying agent ($Na_2SO_4$ anhydrous) was then added to the organic layer after which the organic layer was then transferred to a 2 mL crimp cap vial and analyzed.

EN Calculation:

The EN is measured as the percent hydroxy fatty acids divided by the percent non-hydroxy fatty acids. As an example, a dimer estolide would result in half of the fatty acids containing a hydroxy functional group, with the other half lacking a hydroxyl functional group. Therefore, the EN would be 50% hydroxy fatty acids divided by 50% non-hydroxy fatty acids, resulting in an EN value of 1 that corresponds to the single estolide link between the capping fatty acid and base fatty acid of the dimer.

IV Calculation:

The iodine value is estimated by the following equation based on ASTM Method D97 (ASTM International, Conshohocken, Pa.):

$$IV = \sum 100 \times \frac{A_f \times MW_I \times db}{MW_f}$$

$A_f$=fraction of fatty compound in the sample
$MW_I$=253.81, atomic weight of two iodine atoms added to a double bond
db=number of double bonds on the fatty compound
$MW_f$=molecular weight of the fatty compound The properties of exemplary estolide compounds and compositions described herein are identified in the following examples and tables.

Other Measurements:

Except as otherwise described, pour point is measured by ASTM Method D97-96a, cloud point is measured by ASTM Method D2500, viscosity/kinematic viscosity is measured by ASTM Method D445-97, viscosity index is measured by ASTM Method D2270-93 (Reapproved 1998), specific gravity is measured by ASTM Method D4052, flash point is measured by ASTM Method D92, evaporative loss is measured by ASTM Method D5800, vapor pressure is measured by ASTM Method D5191, and acute aqueous toxicity is measured by Organization of Economic Cooperation and Development (OECD) 203.

Example 1

The acid catalyst reaction was conducted in a 50 gallon Pfaudler RT-Series glass-lined reactor. Oleic acid (65 Kg, OL 700, Twin Rivers) was added to the reactor with 70% perchloric acid (992.3 mL, Aldrich Cat#244252) and heated to 60° C. in vacuo (10 torr abs (Torr absolute; 1 torr=~1 mmHg)) for 24 hrs while continuously being agitated. After 24 hours the vacuum was released. 2-Ethylhexanol (29.97 Kg) was then added to the reactor and the vacuum was restored. The reaction was allowed to continue under the same conditions (60° C., 10 torr abs) for 4 more hours. At which time, KOH (645.58 g) was dissolved in 90% ethanol/water (5000 mL, 90% EtOH by volume) and added to the reactor to quench the acid. The solution was then allowed to cool for approximately 30 minutes. The contents of the reactor were then pumped through a 1 micron (μ) filter into an accumulator to filter out the salts. Water was then added to the accumulator to wash the oil. The two liquid phases were thoroughly mixed together for approximately 1 hour. The solution was then allowed to phase separate for approximately 30 minutes. The water layer was drained and disposed of. The organic layer was again pumped through a 1μ filter back into the reactor. The reactor was heated to 60° C. in vacuo (10 torr abs) until all ethanol and water ceased to distill from solution. The reactor was then heated to 100° C. in vacuo (10 torr abs) and that temperature was maintained until the 2-ethylhexanol ceased to distill from solution. The remaining material was then distilled using a Myers 15 Centrifugal Distillation still at 200° C. under an absolute pressure of approximately 12 microns (0.012 torr) to remove all monoester material leaving behind estolides (Ex. 1). Certain data are reported below in Tables 1 and 8.

Example 2

The acid catalyst reaction was conducted in a 50 gallon Pfaudler RT-Series glass-lined reactor. Oleic acid (50 Kg, OL 700, Twin Rivers) and whole cut coconut fatty acid (18.754 Kg, TRC 110, Twin Rivers) were added to the reactor with 70% perchloric acid (1145 mL, Aldrich Cat#244252) and heated to 60° C. in vacuo (10 torr abs) for 24 hrs while continuously being agitated. After 24 hours the vacuum was released. 2-Ethylhexanol (34.58 Kg) was then added to the reactor and the vacuum was restored. The reaction was allowed to continue under the same conditions (60° C., 10 torr abs) for 4 more hours. At which time, KOH (744.9 g) was dissolved in 90% ethanol/water (5000 mL, 90% EtOH by volume) and added to the reactor to quench the acid. The solution was then allowed to cool for approximately 30 minutes. The contents of the reactor were then pumped through a 1μ filter into an accumulator to filter out the salts. Water was then added to the accumulator to wash the oil. The two liquid phases were thoroughly mixed together for approximately 1 hour. The solution was then allowed to phase separate for approximately 30 minutes. The water layer was drained and disposed of. The organic layer was again pumped through a 1μ filter back into the reactor. The reactor was heated to 60° C. in vacuo (10 torr abs) until all ethanol and water ceased to distill from solution. The reactor was then heated to 100° C. in vacuo (10 torr abs) and that temperature was maintained until the 2-ethylhexanol ceased to distill from solution. The remaining material was then distilled using a Myers 15 Centrifugal Distillation still at 200° C. under an absolute pressure of approximately 12 microns (0.012 torr) to remove all monoester material leaving behind estolides (Ex. 2). Certain data are reported below in Tables 2 and 7.

Example 3

The estolides produced in Example 1 (Ex. 1) were subjected to distillation conditions in a Myers 15 Centrifugal Distillation still at 300° C. under an absolute pressure of approximately 12 microns (0.012 torr). This resulted in a primary distillate having a lower EN average (Ex. 3A), and a distillation residue having a higher EN average (Ex. 3B). Certain data are reported below in Tables 1 and 8.

TABLE 1

| Estolide Base Stock | EN | Pour Point (° C.) | Iodine Value (cg/g) |
|---|---|---|---|
| Ex. 3A | 1.35 | −32 | 31.5 |
| Ex. 1 | 2.34 | −40 | 22.4 |
| Ex. 3B | 4.43 | −40 | 13.8 |

Example 4

Estolides produced in Example 2 (Ex. 2) were subjected to distillation conditions in a Myers 15 Centrifugal Distillation still at 300° C. under an absolute pressure of approximately 12 microns (0.012 torr). This resulted in a primary distillate having a lower EN average (Ex. 4A), and a distillation residue having a higher EN average (Ex. 4B). Certain data are reported below in Tables 2 and 7.

TABLE 2

| Estolide Base Stock | EN | Pour Point (° C.) | Iodine Value (cg/g) |
|---|---|---|---|
| Ex. 4A | 1.31 | −30 | 13.8 |
| Ex. 2 | 1.82 | −33 | 13.2 |
| Ex. 4B | 3.22 | −36 | 9.0 |

Example 5

Estolides produced by the method set forth in Example 1 were subjected to distillation conditions (ASTM D-6352) at 1 atmosphere (atm) over the temperature range of about 0° C. to about 710° C., resulting in 10 different estolide cuts recovered at increasing temperatures The amount of material distilled from the sample in each cut and the temperature at which each cut distilled (and recovered) are reported below in Table 3:

TABLE 3

| Cut (% of total) | Temp. (° C.) |
|---|---|
| 1 (1%) | 416.4 |
| 2 (1%) | 418.1 |
| 3 (3%) | 420.7 |
| 4 (20%) | 536.4 |
| 5 (25%) | 553.6 |
| 6 (25%) | 618.6 |
| 7 (20%) | 665.7 |
| 8 (3%) | 687.6 |

TABLE 3-continued

| Cut (% of total) | Temp. (° C.) |
|---|---|
| 9 (1%) | 700.6 |
| 10 (1%) | 709.1 |

Example 6

Estolides made according to the method of Example 2 were subjected to distillation conditions (ASTM D-6352) at 1 atm over the temperature range of about 0° C. to about 730° C., which resulted in 10 different estolide cuts. The amount of each cut and the temperature at which each cut was recovered are reported in Table 4.

TABLE 4

| Cut (% of total) | Temp. (° C.) |
|---|---|
| 1 (1%) | 417.7 |
| 2 (1%) | 420.2 |
| 3 (3%) | 472.0 |
| 4 (5%) | 509.7 |
| 5 (15%) | 533.7 |
| 6 (25%) | 583.4 |
| 7 (25%) | 636.4 |
| 8 (5%) | 655.4 |
| 9 (5%) | 727.0 |
| 10 (15%) | >727.0 |

Example 7

Estolide base oil 4B (from Example 4) was subjected to distillation conditions (ASTM D-6352) at 1 atm over the temperature range of about 0° C. to about 730° C., which resulted in 9 different estolide cuts. The amount of each cut and the temperature at which each cut was recovered are reported in Table 5a.

TABLE 5a

| Cut (% of total) | Temp. (° C.) |
|---|---|
| 1 (1%) | 432.3 |
| 2 (1%) | 444.0 |
| 3 (3%) | 469.6 |
| 4 (5%) | 521.4 |
| 5 (15%) | 585.4 |
| 6 (25%) | 617.1 |
| 7 (25%) | 675.1 |
| 8 (5%) | 729.9 |
| 9 (20%) | >729.9 |

Example 8

Estolides were made according to the method set forth in Example 1, except that the 2-ethylhexanol esterifying alcohol used in Example 1 was replaced with various other alcohols. Alcohols used for esterification include those identified in Table 5b below. The properties of the resulting estolides are set forth in Table 9.

TABLE 5b

| Alcohol | Structure |
|---|---|
| Jarcol ™ I-18CG | iso-octadecanol |
| Jarcol ™ I-12 | 2-butyloctanol |
| Jarcol ™ I-20 | 2-octyldodecanol |
| Jarcol ™ I-16 | 2-hexyldecanol |
| Jarcol ™ 85BJ | cis-9-octadecen-1-ol |
| Fineoxocol ® 180 | 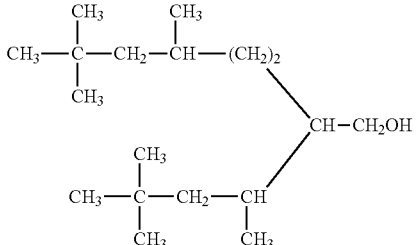 |
| Jarcol ™ I-18T | 2-octyldecanol |

Example 9

Estolides were made according to the method set forth in Example 2, except the 2-ethylhexanol esterifying alcohol was replaced with isobutanol. The properties of the resulting estolides are set forth in Table 9.

Example 10

Estolides of Formula I, II, and III are prepared according to the method set forth in Examples 1 and 2, except that the 2-ethylhexanol esterifying alcohol is replaced with various other alcohols. Alcohols to be used for esterification include those identified in Table 6 below. Esterifying alcohols to be used, including those listed below, may be saturated or unsaturated, and branched or unbranched, or substituted with one or more alkyl groups selected from methyl, ethyl, propyl, isopropyl, butyl, isobutyl, sec-butyl, tert-butyl, pentyl, isopentyl, neopentyl, hexyl, isohexyl, and the like, to form a branched or unbranched residue at the $R_2$ position. Examples of combinations of esterifying alcohols and $R_2$ Substituents are set forth below in Table 6:

TABLE 6

| Alcohol | $R_2$ Substituents |
|---|---|
| $C_1$ alkanol | methyl |
| $C_2$ alkanol | ethyl |
| $C_3$ alkanol | n-propyl, isopropyl |
| $C_4$ alkanol | n-butyl, isobutyl, sec-butyl |
| $C_5$ alkanol | n-pentyl, isopentyl neopentyl |
| $C_6$ alkanol | n-hexyl, 2-methyl pentyl, 3-methyl pentyl, 2,2-dimethyl butyl, 2,3-dimethyl butyl |
| $C_7$ alkanol | n-heptyl and other structural isomers |
| $C_8$ alkanol | n-octyl and other structural isomers |
| $C_9$ alkanol | n-nonyl and other structural isomers |
| $C_{10}$ alkanol | n-decanyl and other structural isomers |
| $C_{11}$ alkanol | n-undecanyl and other structural isomers |

TABLE 6-continued

| Alcohol | $R_2$ Substituents |
|---|---|
| $C_{12}$ alkanol | n-dodecanyl and other structural isomers |
| $C_{13}$ alkanol | n-tridecanyl and other structural isomers |
| $C_{14}$ alkanol | n-tetradecanyl and other structural isomers |
| $C_{15}$ alkanol | n-pentadecanyl and other structural isomers |
| $C_{16}$ alkanol | n-hexadecanyl and other structural isomers |
| $C_{17}$ alkanol | n-heptadecanyl and other structural isomers |
| $C_{18}$ alkanol | n-octadecanyl and other structural isomers |
| $C_{19}$ alkanol | n-nonadecanyl and other structural isomers |
| $C_{20}$ alkanol | n-icosanyl and other structural isomers |
| $C_{21}$ alkanol | n-heneicosanyl and other structural isomers |
| $C_{22}$ alkanol | n-docosanyl and other structural isomers |

TABLE 7

| PROPERTY | ADDITIVES | ASTM METHOD | Ex. 4A | Ex. 2 | Ex. 4B |
|---|---|---|---|---|---|
| Color | None | — | Light Gold | Amber | Amber |
| Specific Gravity (15.5° C.), g/ml | None | D 4052 | 0.897 | 0.904 | 0.912 |
| Viscosity - Kinematic at 40° C., cSt | None | D 445 | 32.5 | 65.4 | 137.3 |
| Viscosity - Kinematic at 100° C., cSt | None | D 445 | 6.8 | 11.3 | 19.9 |
| Viscosity Index | None | D 2270 | 175 | 167 | 167 |
| Pour Point, ° C. | None | D 97 | −30 | −33 | −36 |
| Cloud Point, ° C. | None | D 2500 | −30 | −32 | −36 |
| Flash Point, ° C. | None | D 92 | 278 | 264 | 284 |
| Fire Point, ° C. | None | D 92 | 300 | 300 | 320 |
| Evaporative Loss (NOACK), wt. % | None | D 5800 | 1.9 | 1.4 | 0.32 |
| Vapor Pressure - Reid (RVP), psi | None | D 5191 | ≈0 | ≈0 | ≈0 |

TABLE 8

| PROPERTY | ADDITIVES | ASTM METHOD | Ex. 3A | Ex. 1 | Ex. 3B |
|---|---|---|---|---|---|
| Color | None | — | Light Gold | Amber | Amber |
| Specific Gravity (15.5° C.), g/ml | None | D 4052 | 0.897 | 0.906 | 0.917 |
| Viscosity - Kinematic at 40° C., cSt | None | D 445 | 40.9 | 91.2 | 211.6 |
| Viscosity - Kinematic at 100° C., cSt | None | D 445 | 8.0 | 14.8 | 27.8 |
| Viscosity Index | None | D 2270 | 172 | 170 | 169 |
| Pour Point, ° C. | None | D 97 | −32 | −40 | −40 |
| Cloud Point, ° C. | None | D 2500 | −32 | −33 | −40 |
| Flash Point, ° C. | None | D 92 | 278 | 286 | 306 |
| Fire Point, ° C. | None | D 92 | 300 | 302 | 316 |
| Evaporative Loss (NOACK), wt. % | None | D 5800 | 1.4 | 0.8 | 0.3 |
| Vapor Pressure - Reid (RVP), psi | None | D 5191 | ≈0 | ≈0 | ≈0 |

TABLE 9

| Example # | Alcohol | Estimated EN (approx.) | Pour Pt. °C. | Cloud Pt. °C. | Visc. @ 40° C. | Visc. @ 100° C. | Visc. Index |
|---|---|---|---|---|---|---|---|
| 8 | Jarcol ™ I-18CG | 2.0-2.6 | −15 | −13 | 103.4 | 16.6 | 174 |
| 8 | Jarcol ™ I-12 | 2.0-2.6 | −39 | −40 | 110.9 | 16.9 | 166 |
| 8 | Jarcol ™ I-20 | 2.0-2.6 | −42 | <−42 | 125.2 | 18.5 | 166 |
| 8 | Jarcol ™ I-16 | 2.0-2.6 | −51 | <−51 | 79.7 | 13.2 | 168 |
| 8 | Jarcol ™ 85BJ | 2.0-2.6 | −15 | −6 | 123.8 | 19.5 | 179 |
| 8 | Fineoxocol ® 180 | 2.0-2.6 | −39 | −41 | 174.2 | 21.1 | 143 |
| 8 | Jarcol ™ I-18T | 2.0-2.6 | −42 | <−42 | 130.8 | 19.2 | 167 |
| 8 | Isobutanol | 2.0-2.6 | −36 | −36 | 74.1 | 12.6 | 170 |
| 9 | Isobutanol | 1.5-2.2 | −36 | −36 | 59.5 | 10.6 | 170 |

Example 11

Saturated and unsaturated estolides having varying acid values were subjected to several corrosion and deposit tests. These tests included the High Temperature Corrosion Bench Test (HTCBT) for several metals, the ASTM D130 corrosion test, and the MHT-4 TEOST (ASTM D7097) test for correlating piston deposits. The estolides tested having higher acid values (0.67 mg KOH/g) were produced using the method set forth in Examples 1 and 4 for producing Ex. 1 and Ex. 4A (Ex. 1* and Ex. 4A* below). The estolides tested having lower acid values (0.08 mg KOH/g) were produced using the method set forth in Examples 1 and 4 for producing Ex. 1 and Ex. 4A except the crude free-acid estolide was worked up and purified prior to esterification with $BF_3 \cdot OET_2$ (0.15 equiv.; reacted with estolide and 2-EH in Dean Stark trap at 80° C. in vacuo (10 torr abs) for 12 hrs while continuously being agitated; crude reaction product washed 4× $H_2O$; excess 2-EH removed by heating washed reaction product to 140° C. in vacuo (10 torr abs) for 1 hr) (Ex. 4A# below). Estolides having an IV of 0 were hydrogenated via 10 wt. % palladium embedded on carbon at 75° C. for 3 hours under a pressurized hydrogen atmosphere (200 psig) (Ex. 4A*H and Ex. 4A#H below). The corrosion and deposit tests were performed with a Dexos™ additive package. Results were compared against a mineral oil standard:

TABLE 10

|  | Standard | Ex. 1* Estolide | Ex. 4A* Estolide | Ex. 4A*H Estolide | Ex. 4A# Estolide | Ex. 4A#H Estolide |
|---|---|---|---|---|---|---|
| Acid Value (mg KOH/g) | — | ~0.7 | 0.67 | 0.67 | 0.08 | 0.08 |
| Iodine Value (IV) | — | ~45 | 16 | 0 | 16 | 0 |
| HTCBT Cu | 13 | 739 | 279 | 60 | 9.3 | 13.6 |
| HTCBT Pd | 177 | 11,639 | 1,115 | 804 | 493 | 243 |
| HTCBT Sn | 0 | 0 | 0 | 0 | 0 | 0 |
| ASTM D130 | 1A | 4B | 3A | 1B | 1A | 1A |
| MHT-4 | 18 | 61 | 70 | 48 | 12 | 9.3 |

Example 12

"Ready" and "ultimate" biodegradability of the estolide produced in Ex. 1 was tested according to standard OECD procedures. Results of the OECD biodegradability studies are set forth below in Table 11:

TABLE 11

|  | 301D 28-Day (% degraded) | 302D Assay (% degraded) |
|---|---|---|
| Canola Oil | 86.9 | 78.9 |
| Ex. 1 Base Stock | 64.0 | 70.9 |

Example 13

The Ex. 1 estolide base stock from Example 1 was tested under OECD 203 for Acute Aquatic Toxicity. The tests showed that the estolides are nontoxic, as no deaths were reported for concentration ranges of 5,000 mg/L and 50,000 mg/L.

Example 14

The estolide base stock of Ex. 3B (85 wt. %) is added to a stainless steel Hobart mixing bowl with ZDDP, sulfurized fats and glyceridic oils, benzamine derivatives, and a fatty acid derivative of 4,5-dihydro-1H-imidazole (Elco® 8101 package, 5 wt. %), and lithium 12-hydroxy stearate (10 wt. %). The contents of the bowl are mixed for 15 min to provide a lithium-based grease product.

Example 15

The estolide base stock of Ex. 3B (85 wt. %) and BHT (1 wt. %) are heated to 50° C. under magnetic stirring until the BHT is dissolved. The solution is then transferred to a stainless steel Hobart mixing bowl, to which ZDDP, sulfurized fats and glyceridic oils, benzamine derivatives, and a fatty acid derivative of 4,5-dihydro-1H-imidazole (Elco® 8101 package, 4 wt. %), and lithium 12-hydroxystearate (10 wt. %) are added. The contents of the bowl are mixed for 15 min to provide lithium-based grease product.

Example 16

The estolide base stock of Ex. 3B (86 wt. %) and 12-hydroxystearic acid (12.3 wt. %) are added to a stainless steel Hobart mixing bowl. The contents are stirred and heated to 85° C., to which is added calcium hydroxide (1.7 wt. %). The temperature is raised to 150° C. and the contents of the bowl are stirred for 2 hours, over the course of which water is removed. The contents of the bowl are then cooled to room temperature and milled.

Example 17

The estolide base stock of Ex. 3B (86 wt. %) and 12-hydroxystearic acid (12.3 wt. %) are added to a stainless steel Hobart mixing bowl. The contents are stirred and heated to 85° C., to which is added lithium hydroxide monohydrate (1.7 wt. %). The temperature is raised to 200° C. and the contents of the bowl are stirred for 2 hours, over the course of which water is removed. The contents of the bowl are then cooled to room temperature and milled.

Example 18

The estolide base stock of Ex. 3B (30 wt. %), HVI 160® paraffinic base oil (56 wt. %) from Shell Co., and 12-hydroxystearic acid (12.3 wt. %) are added to a stainless steel Hobart mixing bowl. The contents are stirred and heated to 85° C., to which is added lithium hydroxide monohydrate (1.7 wt. %). The temperature is raised to 200° C. and the contents of the bowl are stirred for 2 hours, over the course of which water is removed. The contents of the bowl are then cooled to room temperature and milled.

Example 19

Greases are prepared in substantially the same manner as those in Examples 16-18, except the 12-hydroxystearic acid is replaced with ricinoleic acid.

Example 20

Greases are prepared in substantially the same manner as those in Examples 14-19, except the estolide base stock of Ex. 3B is replaced with the estolide base stock of Ex. 4B.

Example 21

Greases are prepared in substantially the same manner as those in Examples 14-19, except the estolide base stock of Ex. 3B is replaced with the estolide base stock of Ex. 2.

The invention claimed is:

1. A composition comprising:
   at least 25% by weight of an estolide base oil; and
   at least one thickener selected from a metal soap, a polyurea, a fluorocarbon resin, or a silica.

2. The composition according to claim 1, wherein the estolide base oil comprises one or more compounds of Formula I:

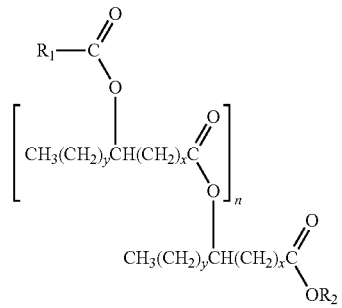

wherein
   x is, independently for each occurrence, an integer selected from 0 to 20;
   y is, independently for each occurrence, an integer selected from 0 to 20;
   n is equal to or greater than 0;
   $R_1$ is selected from hydrogen and an optionally substituted alkyl that is saturated or unsaturated, and branched or unbranched; and
   $R_2$ is an optionally substituted alkyl that is saturated or unsaturated, and branched or unbranched;
      wherein each fatty acid chain residue of said at least one compound is independently optionally substituted.

3. The composition according to claim 2, wherein
   x is, independently for each occurrence, an integer selected from 0 to 14;
   y is, independently for each occurrence, an integer selected from 0 to 14;
   n is an integer selected from 0 to 20;
   $R_1$ is an optionally substituted $C_1$ to $C_{22}$ alkyl that is saturated or unsaturated, and branched or unbranched; and
   $R_2$ is an unsubstituted $C_1$ to $C_{22}$ alkyl that is saturated or unsaturated, and branched or unbranched,
   wherein each fatty acid chain residue is unsubstituted.

4. The composition according to claim 3, wherein $R_1$ is unsubstituted and unbranched.

5. The composition according to claim 4, wherein $R_1$ is saturated.

6. The composition according to claim 3, wherein $R_2$ is saturated.

7. The composition according to claim 3, wherein x is, independently for each occurrence, an integer selected from 7 and 8.

8. The composition according to claim 7, wherein y is, independently for each occurrence, an integer selected from 7 and 8.

9. The composition according to claim 3, wherein x is 10 for each occurrence.

10. The composition according to claim 9, wherein y is 5 for each occurrence.

11. The composition according to claim 3, wherein said estolide base oil has an EN selected from an integer or fraction of an integer that is equal to or greater than 3, wherein EN is the average number of estolide linkages in compounds according to Formula I.

12. The composition according to claim 3, wherein the at least one thickener comprises one or more of a simple lithium soap or a complex lithium soap.

13. The composition according to claim 12, wherein the at least one thickener comprises one or more of lithium stearate, lithium 12-hydroxy stearate, lithium 16-hydroxystearate, or lithium ricinoleate.

14. The composition according to claim 3, wherein the at least one thickener comprises a metal soap that is a reaction product of at least one metal-based material and at least one carboxylic acid or carboxylic acid ester.

15. The composition according to claim 14, wherein the at least one metal-based material comprises one or more of a metal hydroxide, a metal carbonate, a metal bicarbonate, or a metal oxide.

16. The composition according to claim 14, wherein the metal of the at least one metal-based material comprises one or more of an alkali metal or alkaline earth metal.

17. The composition according to claim 3, wherein said composition further comprises at least one additive.

18. The composition according to claim 17, wherein the at least one additive comprises one or more of a preservative, an antioxidant, a colorant, an anti-weld agent, an extreme pressure agent, a flame retardant, a rust inhibitor, a corrosion inhibitor, an oil bleed inhibitor, a metal deactivator, a viscosity modifier, a tackifier, or a pour point depressant.

19. The composition according to claim 3, wherein the estolide base oil comprises 30% to 95% by weight of the composition.

20. The composition according to claim 3, wherein the estolide base oil comprises 50% to 95% by weight of the composition.

21. The composition according to claim 3, wherein the at least one thickener comprises one or more of a simple metal soap or a complex metal soap.

22. The composition according to claim 3, further comprising at least one trimellitate.

23. The composition according to claim 3, wherein the at least one thickener comprises a polyurea.

24. The composition of claim 23, wherein the at least one thickener comprises a polyurea complex.

25. The composition of claim 3, wherein the at least one thickener comprises a silica.

26. The composition of claim 25, wherein the at least one thickener comprises a fumed silica.

* * * * *